（12) United States Patent
Johnson et al.

(10) Patent No.: US 6,705,961 B2
(45) Date of Patent: Mar. 16, 2004

(54) VARIABLE SPEED TRANSMISSION AND ELECTRONIC SPEED CONTROL THEREFOR

(75) Inventors: Kevin L. Johnson, Salem, IN (US); Richard T. Ruebusch, New Albany, IN (US); Jason D. Voyles, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/902,412

(22) Filed: Jul. 10, 2001

(65) Prior Publication Data

US 2002/0034994 A1 Mar. 21, 2002

Related U.S. Application Data

(60) Provisional application No. 60/218,332, filed on Jul. 14, 2000.

(51) Int. Cl.$^7$ ................................................ F16H 55/56
(52) U.S. Cl. .............................. 474/8; 474/23; 474/29; 56/11.4
(58) Field of Search .............................. 474/8, 29, 33, 474/23, 69, 35; 56/11.4

(56) References Cited

U.S. PATENT DOCUMENTS

| 2,134,159 A | 10/1938 | Van Hofe ................. 74/230.17 |
| 2,235,122 A | 3/1941 | Shaw ..................... 74/230.17 |
| 2,308,868 A | 1/1943 | Durdin, Jr. ............... 74/230.17 |
| 2,341,273 A | 2/1944 | Helberg ...................... 74/501 |
| 2,360,076 A | * 10/1944 | Shaw ............................ 474/1 |
| 2,459,969 A | 1/1949 | Schweickart ................. 74/793 |
| 2,475,955 A | 7/1949 | Gerbing .................... 74/230.17 |
| 2,639,569 A | 5/1953 | Pasturczak ..................... 56/20 |
| 2,740,246 A | 4/1956 | Smith et al. ................. 56/11.4 |
| 2,813,433 A | 11/1957 | Adams, Jr. et al. ........... 74/218 |
| 2,824,457 A | 2/1958 | Norton .................... 74/230.17 |

(List continued on next page.)

FOREIGN PATENT DOCUMENTS

| EP | 0223870 | 6/1987 |
| EP | 2 780 129 | 12/1999 |
| FR | 2660977 | 10/1991 |
| FR | 2704287 | 10/1994 |
| FR | 2774953 | 8/1999 |
| FR | 2780128 | 12/1999 |

Primary Examiner—David Fenstermacher
(74) Attorney, Agent, or Firm—Baker & Daniels

(57) ABSTRACT

A variable speed transmission including a housing, a drive shaft having an axis of rotation and rotatably supported in the housing, an output shaft having an axis of rotation and rotatably supported in the housing, a first pulley and a second pulley both having a common axis of rotation, a third pulley having an axis of rotation and rotatably attached to the drive shaft, and a belt. The output shaft is operatively connected to the drive shaft. The first pulley and the second pulley each have a variable pitch diameter and changes in the first and second pulley variable pitch diameters being inversely proportional. The third pulley and one of the first and the second pulleys are in engagement though the belt.

52 Claims, 19 Drawing Sheets

U.S. PATENT DOCUMENTS

| | | | |
|---|---|---|---|
| 2,900,832 A | * | 8/1959 | Snartemo ..................... 474/34 |
| 2,911,838 A | | 11/1959 | McGrath ................... 74/190.5 |
| 2,924,994 A | | 2/1960 | Adee ............................ 474/5 |
| 3,129,598 A | | 4/1964 | Buss ....................... 74/230.17 |
| 3,145,584 A | | 8/1964 | Fairbank et al. ............... 474/1 |
| 3,263,763 A | * | 8/1966 | Adams, Jr. ................... 180/6.2 |
| 3,295,384 A | * | 1/1967 | Love et al. ................... 474/27 |
| 3,381,503 A | | 5/1968 | Beck ............................ 68/12 |
| 3,470,757 A | | 10/1969 | Miley ......................... 474/27 |
| 3,494,210 A | | 2/1970 | Ashton et al. ........... 74/230.17 |
| 3,496,918 A | | 2/1970 | Finlay .......................... 123/90 |
| 3,515,010 A | | 6/1970 | Wagstaff et al. .............. 474/27 |
| 3,583,251 A | | 6/1971 | Peterson .................. 74/230.17 |
| 3,583,535 A | | 6/1971 | Plamper ..................... 192/219 |
| 3,628,115 A | | 12/1971 | Pruitt .......................... 318/345 |
| 3,628,390 A | | 12/1971 | Van Der Lely et al. . 74/230.17 |
| 3,759,342 A | | 9/1973 | Plamper .................. 180/70 R |
| 3,777,585 A | | 12/1973 | Plamper .................... 474/27 |
| 3,863,514 A | * | 2/1975 | Jensen ......................... 474/13 |
| 3,915,023 A | | 10/1975 | Lacroix ............... 74/230.17 B |
| 4,063,467 A | | 12/1977 | F'Geppert .................... 74/689 |
| 4,085,697 A | * | 4/1978 | Gaasenbeek ................ 180/338 |
| 4,088,036 A | | 5/1978 | Hillman ............... 74/230.17 A |
| 4,094,205 A | | 6/1978 | Cook .................. 74/242.1 FP |
| 4,128,017 A | | 12/1978 | Clarke ................ 74/230.17 D |
| 4,132,121 A | | 1/1979 | Clarke ......................... 474/27 |
| 4,174,641 A | | 11/1979 | Hillman ............... 74/230.17 A |
| 4,176,560 A | | 12/1979 | Clarke ......................... 474/27 |
| 4,310,082 A | | 1/1982 | Elmy et al. ................. 192/218 |
| 4,484,901 A | | 11/1984 | Toti et al. ..................... 474/28 |
| 4,498,889 A | | 2/1985 | Stevens et al. ............. 474/133 |
| 4,653,345 A | | 3/1987 | Edwards ..................... 475/206 |
| 4,721,494 A | | 1/1988 | Hayashi et al. ............... 474/88 |
| 4,934,989 A | | 6/1990 | Furukawa et al. .......... 474/135 |
| 4,990,123 A | | 2/1991 | Krude ......................... 474/50 |
| 5,041,067 A | | 8/1991 | Hauser ....................... 475/211 |
| 5,286,233 A | | 2/1994 | Engelstad et al. .......... 474/101 |
| 5,399,123 A | | 3/1995 | Blackburn ................... 474/16 |
| 5,410,923 A | | 5/1995 | Yamashita et al. ............ 74/474 |
| 5,662,538 A | | 9/1997 | Wang .......................... 474/11 |
| 5,718,105 A | | 2/1998 | Irikura et al. ................ 56/11.4 |
| 5,803,847 A | | 9/1998 | Kamm ......................... 474/37 |
| 5,848,949 A | | 12/1998 | Miyata et al. .............. 475/210 |
| 5,894,907 A | | 4/1999 | Peter .......................... 180/374 |
| 6,033,339 A | | 3/2000 | Aberson et al. ............. 477/46 |
| 6,120,401 A | | 9/2000 | Wilken ...................... 474/109 |
| 6,142,898 A | | 11/2000 | Miyata ........................ 474/29 |
| 6,186,916 B1 | | 2/2001 | Blanchard .................... 474/14 |
| 2001/0020565 A1 | | 9/2001 | Blanchard .................... 474/14 |

\* cited by examiner

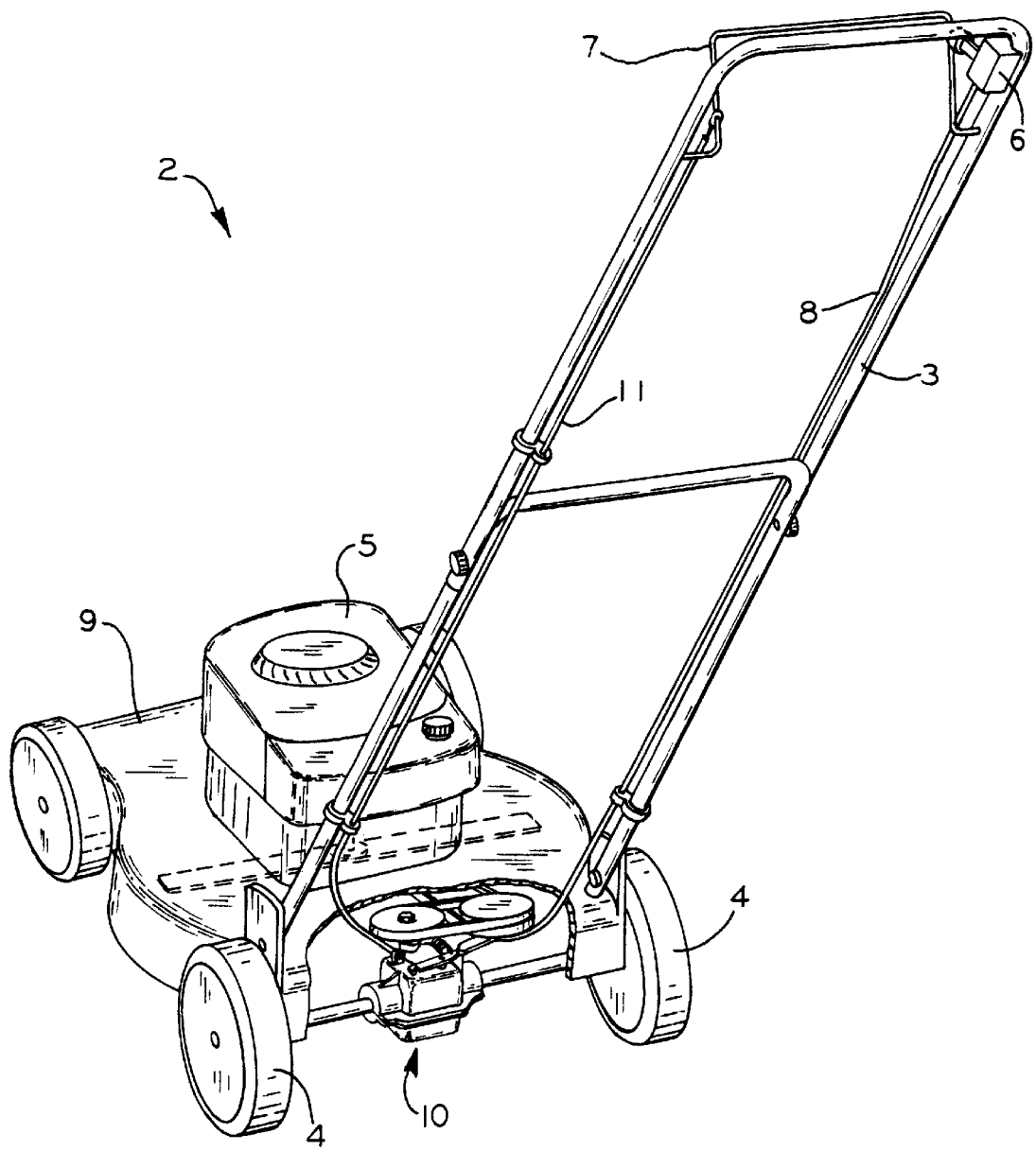
FIG_1A

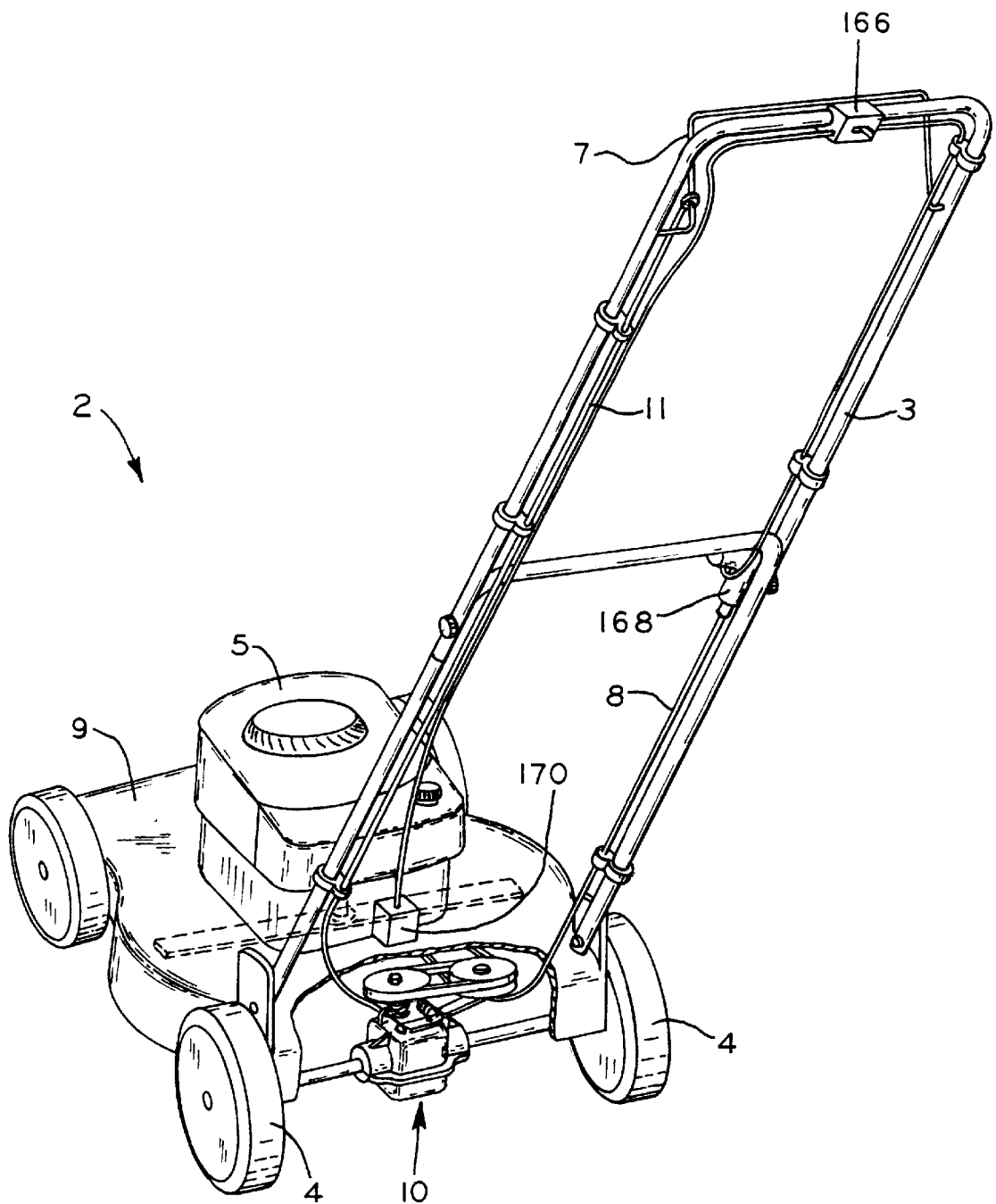
FIG_1B

FIG_4

FIG._5

FIG_8

FIG_9

FIG_10

FIG_11

FIG_13

VARIABLE SPEED TRANSMISSION AND ELECTRONIC SPEED CONTROL THEREFOR

CROSS REFERENCE TO RELATED APPLICATIONS

This application is related to and claims the benefit under 35 U.S.C. § 119(e) of U.S. Provisional Application Ser. No. 60/218,332, entitled VARIABLE SPEED TRANSMISSION, filed on Jul. 14, 2000.

BACKGROUND OF THE INVENTION

1. Field of the Invention

This invention relates to belt drive systems for vehicles and, more particularly, to a belt drive system for lawn and garden tractors, walk-behind mowers and other vehicles which utilize a constant engine drive speed to propel the vehicle at variable speeds.

2. Description of the Related Art

Variable speed transmission assemblies for lawn and garden tractors and self-propelled walk-behind mowers allow for the ground speed to be varied while maintaining a constant engine speed. Constant engine speed facilitates, for example, effective cutting by mower blades. Previous variable speed transmission designs, such as those disclosed in U.S. Pat. No. 6,142,898 (Miyata), have incorporated various planetary gear arrangements. Other variable speed transmission designs, such as those disclosed in U.S. Pat. No. 4,484,901 (Toti et al.) and U.S. Pat. No. 4,934,989 (Furukawa et al.), include multiple drive belt and multiple pulley systems to propel a mower or tractor while still maintaining a constant engine speed.

Planetary gear arrangements usually include a series of intermeshed gears to provide a suitable mower axle speed when the engine is operating at a relatively fast engine shaft speed. A problem with such planetary gear arrangements is that they considerably increase mower costs. Multiple drive belt and pulley systems, such as that disclosed in U.S. Pat. No. 4,934,989 (Furukawa et al.), typically include at least one belt tensioner or idle pulley which is merely used to maintain tension on the belts. However, these systems generally require more space and, like planetary gear arrangements, increase the mower costs since the systems require more expensive assembly operations.

An inexpensive infinitely variable speed transmission which includes a declutching mechanism and allows for greater ease of control by the operator would be highly desirable.

SUMMARY OF THE INVENTION

The present invention provides a variable speed transmission which overcomes the disadvantages of prior transmissions and/or speed controls therefor by providing an inexpensive variable speed transmission that requires less space through the use of self-adjusting pulleys. Additionally, a clutch mechanism is provided on the transmission for clutching and declutching the transmission. Furthermore, the operator need only move the pivot arm of the transmission to cause a change in the speed of the transmission, thereby providing ease of control of the transmission. The variable speed transmission may include an electronic speed control to prevent the varying the speed setting of the transmission while the engine is not running and to facilitate easy ground speed changes to an implement, such as a walk-behind mower, having the inventive transmission. Furthermore, the electronic speed control allows the operator to select the desired speed by tapping a switch, thereby providing additional eases of control of the transmission.

The present invention provides a variable speed transmission including a housing, a drive shaft having an axis of rotation and rotatably supported in the housing, an output shaft having an axis of rotation and rotatably supported in the housing, a first pulley and a second pulley both having a common axis of rotation, a third pulley having an axis of rotation and rotatably attached to the drive shaft, and a belt. The output shaft is operatively connected to the drive shaft. The first pulley and the second pulley each have a variable pitch diameter and changes in the first and second pulley variable pitch diameters being inversely proportional. The third pulley and one of the first and the second pulleys are in engagement though the belt.

The present invention further provides an implement including a deck, an engine attached to the deck and having a pulley, an axle rotatably supported by the deck, a ground engaging wheel driven by the axle, a variable speed transmission attached to the deck, and a drive belt. The variable speed transmission includes a housing, a drive shaft having an axis of rotation and rotatably supported in the housing, a first variable pitch diameter pulley and a second variable pitch diameter pulley having a common axis of rotation, a third pulley rotatably attached to the drive shaft, and a transmission belt. The drive shaft is operatively connected to the axle. The first variable pitch diameter pulley has a first variable pitch diameter and the second variable pitch diameter pulley has a second variable pitch diameter and the first and the second variable pitch diameters are in an inversely proportional relationship. The third pulley assembly and one of the first and the second variable pitch diameter pulleys are in engagement though the transmission belt. The drive belt extends between the engine pulley and the other of the first and second pulleys.

The present invention further provides an electronic ground speed regulator for an implement including a variable speed transmission having a speed control mechanism, an electric linear actuator in communication with the speed control mechanism, an electronic control circuit in electrical communication with the actuator, and an operator-manipulated switch in electrical communication with the electronic control circuit. The actuator has a first position and a second position and is moved therebetween in response to changes in an electrical input to the actuator, and the speed control mechanism is varied in response to movement of the actuator from one of the first and second positions to the other of the first and second positions. The electronic circuit has a first condition wherein the electronic control circuit maintains the actuator in one of its first and second positions and a second condition wherein the electronic control circuit controls movement of the actuator between its first and second positions. Movement of the actuator is controlled through manipulation of the switch.

BRIEF DESCRIPTION OF THE DRAWINGS

The above mentioned and other features and objects of this invention will become more apparent and the invention itself will be better understood by reference to the following description of embodiments of the invention taken in conjunction with the accompanying drawings, wherein:

FIG. 1A is a first embodiment of an implement having a variable speed transmission in accordance with the present invention, the transmission being manually actuated;

FIG. 1B is a second embodiment of the implement of FIG. 1A, the transmission being electronically actuated;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 2:
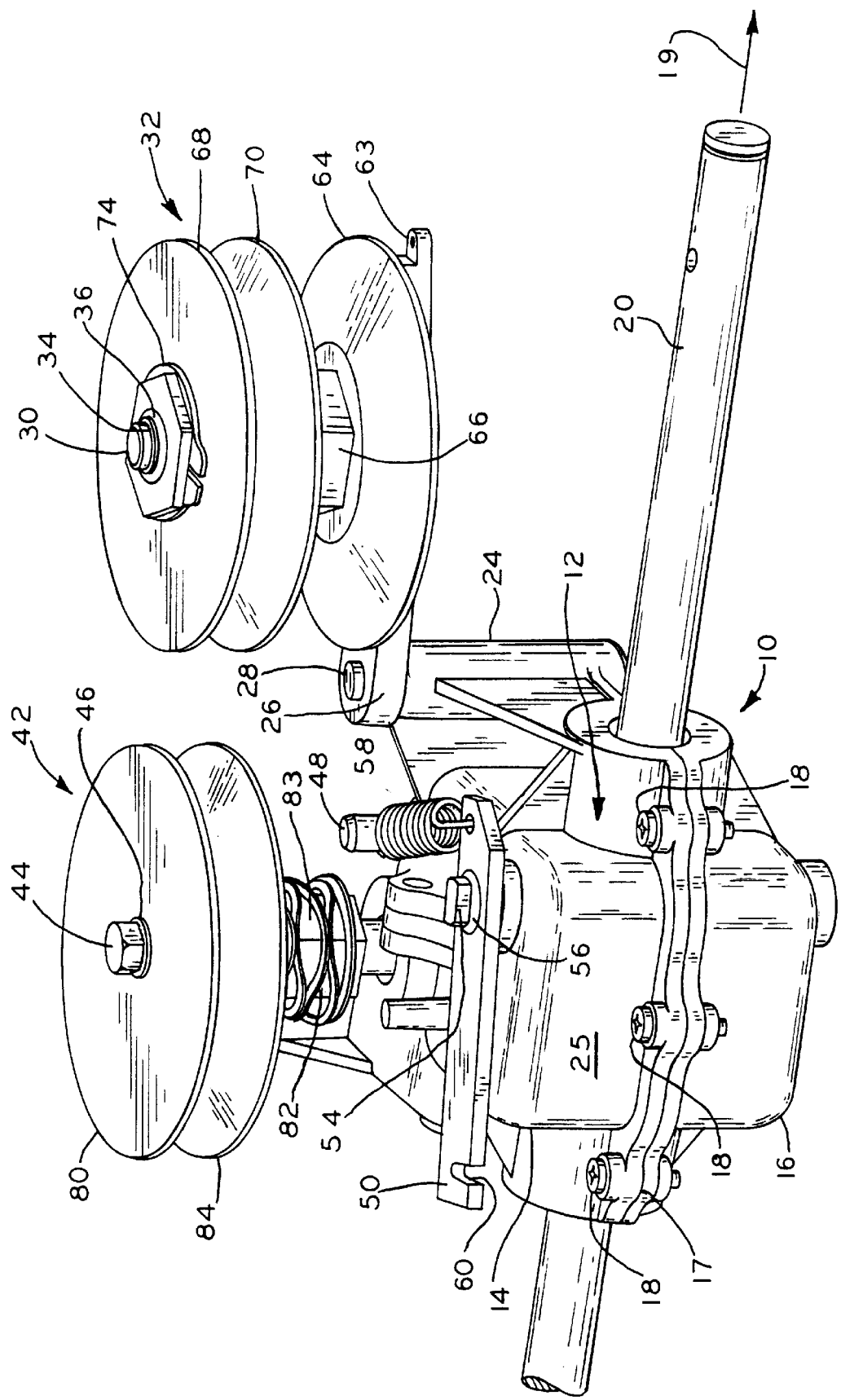
FIG. 2 is an upper rear perspective view of a first embodiment variable speed transmission in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended.

Referring first to FIGS. 1A and 1B, implement, or lawnmower, 2 is shown as having engine 5 mounted on deck 9 and handle 3 attached to deck 9. Attached to the ends of axle 20 (FIG. 2) are ground engaging wheels 4; however, ground engaging wheels 4 may be rotatably attached to deck 9 and driven by axle 20 through reduction gearing (not shown). Bail 7 is attached to handle 3 and has cable linkage 11 to move actuator lever 50 and engage a clutch in transaxle housing assembly 12, thereby allowing movement of implement 2, as described hereinbelow. As shown in FIG. 1A, handle 3 may include a manual control mechanism 6 which is used by the operator to move cable 8, thereby moving pivot arm 26 (FIG. 2). Alternatively, as shown in FIG. 1B, handle 3 may include switch 166 connected to linear actuator 168, which is then used to move cable 8 and pivot arm 26.

Figure 3:
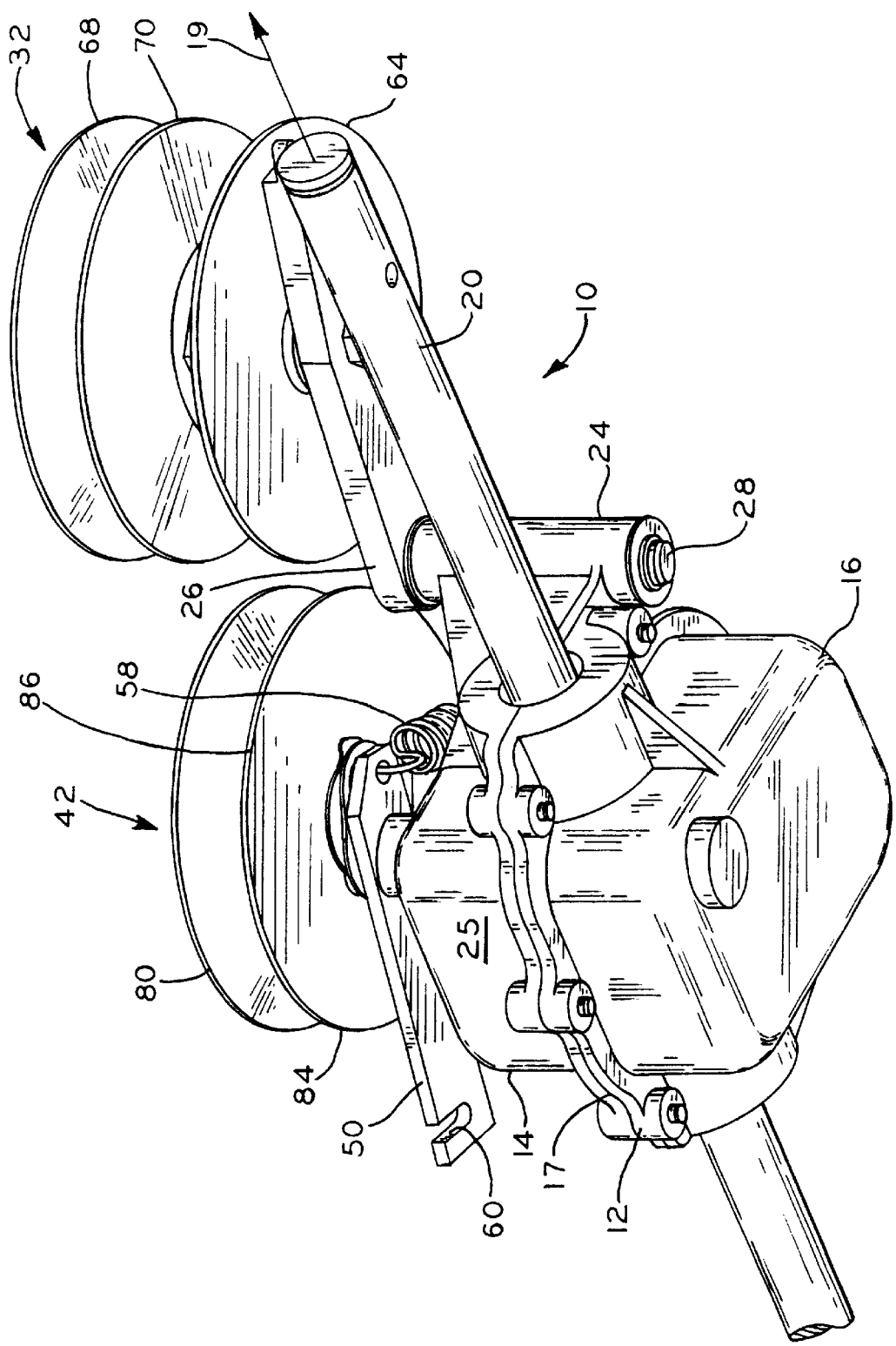
FIG. 3 is a lower rear perspective view of the variable speed transmission of FIG. 2.

Referring to FIGS. 2 and 3, first embodiment variable speed transmission 10 includes housing assembly 12 comprising two halves, 14 and 16, which are fastened together by a plurality of bolts 18 at interface 17. Axle 20 has axis of rotation 19 and is rotatably supported within housing 12 by a pair of roller bearings 13 and 15 provided respectively in sleeve assemblies 22 and 23 (FIGS. 5, 6A and 12), which are fixed between housing halves 14 and 16. Cylindrical boss 24 is integrally attached to external surface 25 of housing half 14 and extends vertically relative to housing half 14. Pivot post 28 is rotatable within a through hole (not shown) formed in boss 24, and supports pivot arm 26 which is fixed to an end of pivot post 28. Pivot arm 26 includes pulley post 30, upon which is rotatably supported pivot pulley assembly 32, which is retained on post 30 by retaining ring 34 engaged within a groove formed within post 30. Washer 36 is positioned between pivot pulley assembly 32 and retaining ring 34 to allow non-binding rotation of pulley assembly 32.

Figure 4:
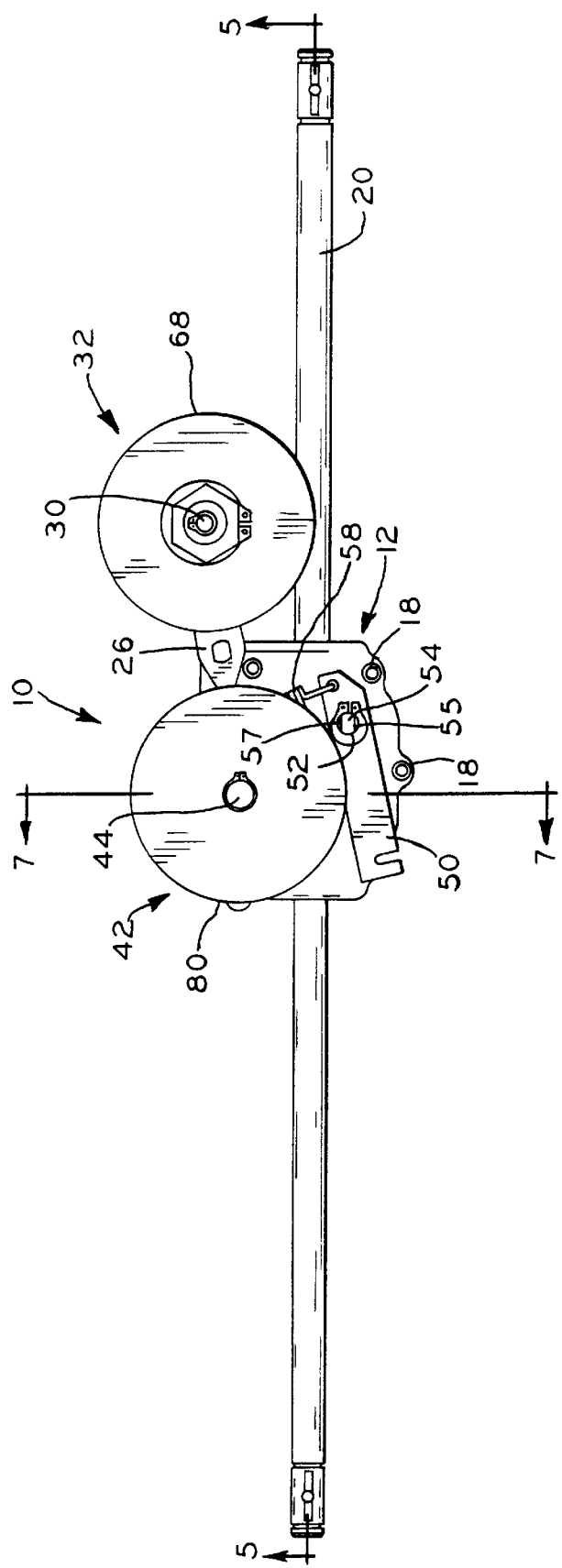
FIG. 4 is a top plan view of the variable speed transmission of FIG. 2.

Engagement and disengagement of transmission 10 is exercised selectively through operator control of cable linkage 11 (FIGS. 1A and 1B) linked to actuator lever 50, which is fixed to actuator rod 54 and includes slot 52 that conforms to and is engaged with flats 55 and 57 of rod 54. Actuator rod 54 is rotatably supported within housing 12 and includes a pair of flats 55 and 57 extending through slot 52 to prevent lever rotation relative to actuator rod 54 (FIG. 4). Actuator lever 50 is prevented from being detached from actuator rod 54 by retaining ring 56 which is engaged within a groove positioned at an upper end of actuator rod 54. Spring 58 is attached between actuator lever 50 and post 48 (FIG. 2) to return actuator lever 50 to a position corresponding to disengagement of drive shaft 44 from axle 20 (FIG. 6A) when actuator lever 50 is not selectively engaged. Notch 60 is provided at an end of actuator lever 50 to accommodate cable linkage 11 (FIGS. 1A and 1B) to rotate actuator rod 54, which in turn, engages and disengages drive shaft 44 from axle 20 as further described hereinbelow.

Figure 8:
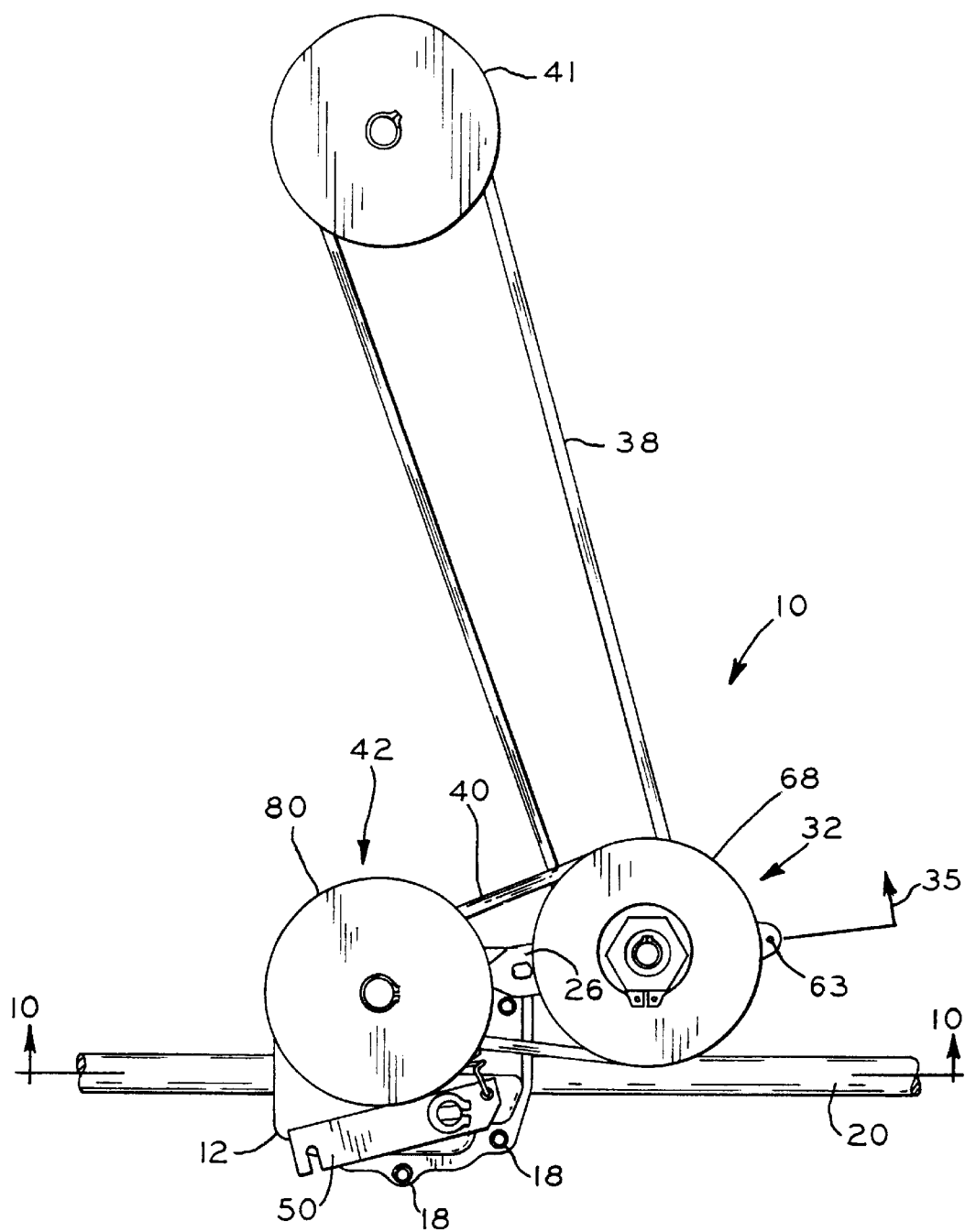
FIG. 8 is a top plan view of the variable speed transmission of FIG. 2 showing engagement of the drive belt with the output pulley of a power source and corresponding to a pivot arm position which provides the greatest axle speed.
Figure 9:
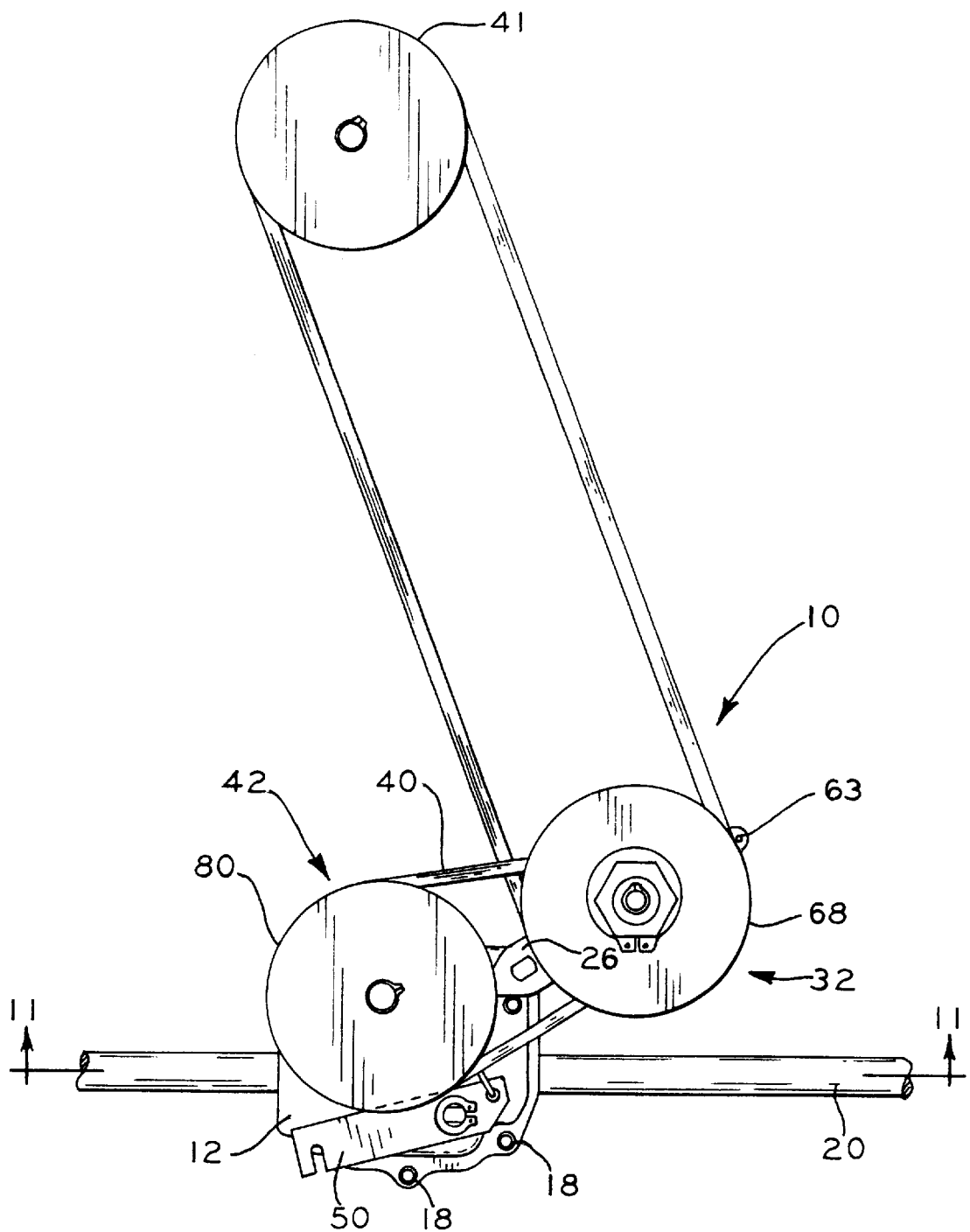
FIG. 9 is a top plan view of the variable speed transmission of FIG. 2 showing engagement with the output pulley of a power source and corresponding to a pivot arm position which provides the lowest axle speed.
Figure 10:
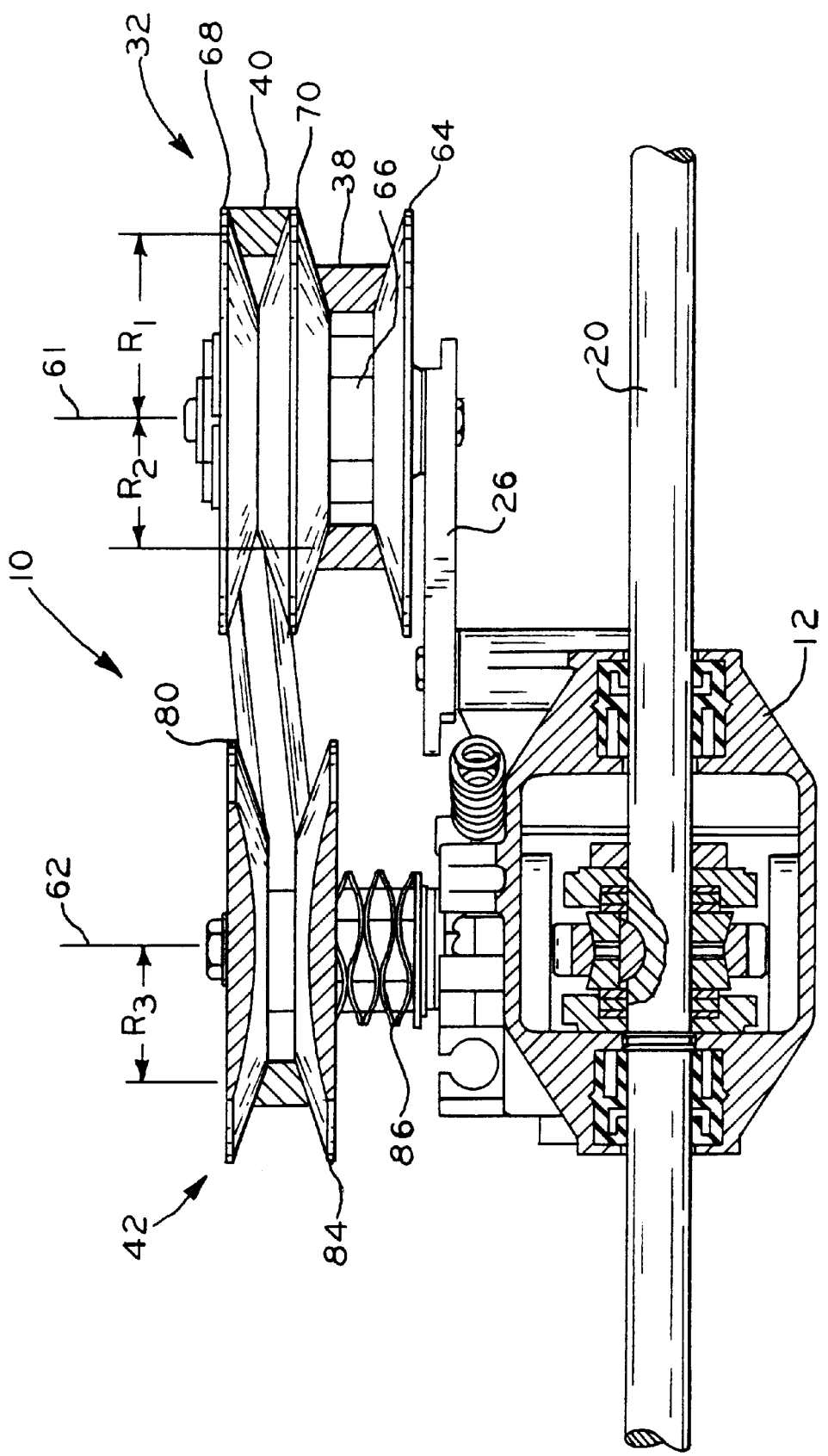
FIG. 10 is a sectional view of the variable speed transmission of FIG. 8 taken along line 10—10, the belts sectioned for clarity.
Figure 11:
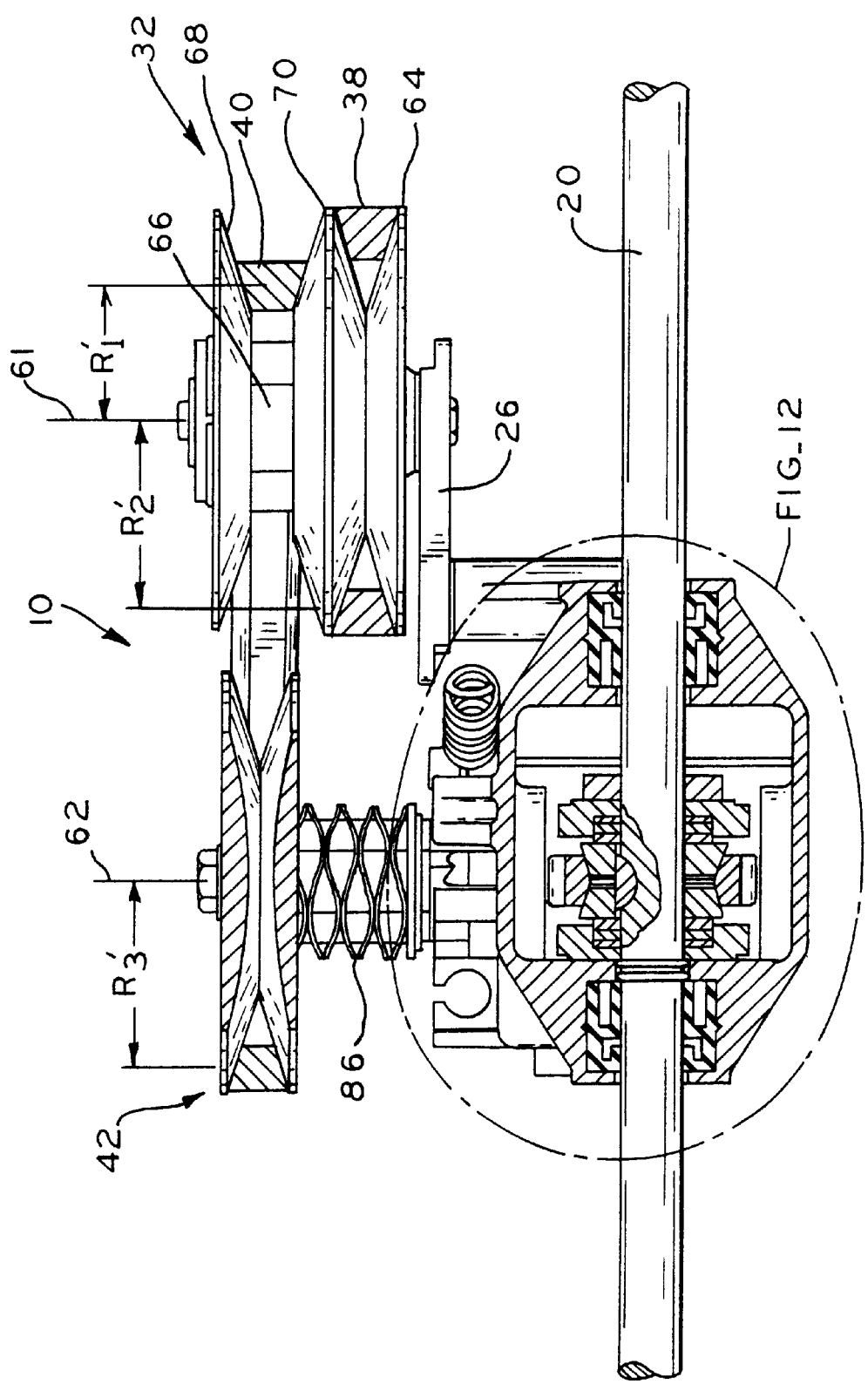
FIG. 11 is a sectional view of the variable speed transmission of FIG. 9 taken along line 11—11, the belts sectioned for clarity.

Pivot pulley assembly 32 and transmission pulley assembly 42 are externally positioned relative to housing 12 of transmission 10, and pivot pulley assembly 32 is engaged by both first mechanical linkage, or transmission belt, 40 and second mechanical linkage, or drive belt, 38, respectively (FIGS. 2–6A, 8–11). Pivot pulley assembly 32 includes axis of rotation 61 and transmission pulley assembly 42 includes axis of rotation 62 (FIGS. 10–11). It may be seen that selective rotation of pivot arm 26 effectuates movement of rotational axis 61 relative to rotational axis 62, such as in the direction of arrow 35, as shown in FIG. 8. Pivot pulley assembly 32, as best seen in FIGS. 2, 6A, 10 and 11, includes pulley end 64 integrally attached to hexagonally shaped hub 66 and rotatably supported by pulley post 30. Second pulley end 68 includes hexagonally shaped hole 69 axially and slidably engaged with hub 66 (FIG. 6A) to prevent rotational movement of pulley end 68 relative to hub 66. Pulley end 68 is retained on post 30 by circumferentially engaged retaining ring 74, and thrust washer 72 is placed between retaining ring 74 and pulley end 64 to prevent rotational binding therebetween. Pulley center section 70 is arranged intermediate pulley ends 64 and 68 respectively, and includes inner hexagonally shaped hole 75 through which hub 66 slidably extends to provide movement of center section 70 axially along hub 66. Having center section 70 arranged in this manner provides a first pulley and a second pulley, each having variable pitch diameters, which are in an inversely proportional relationship.

Figure 5:
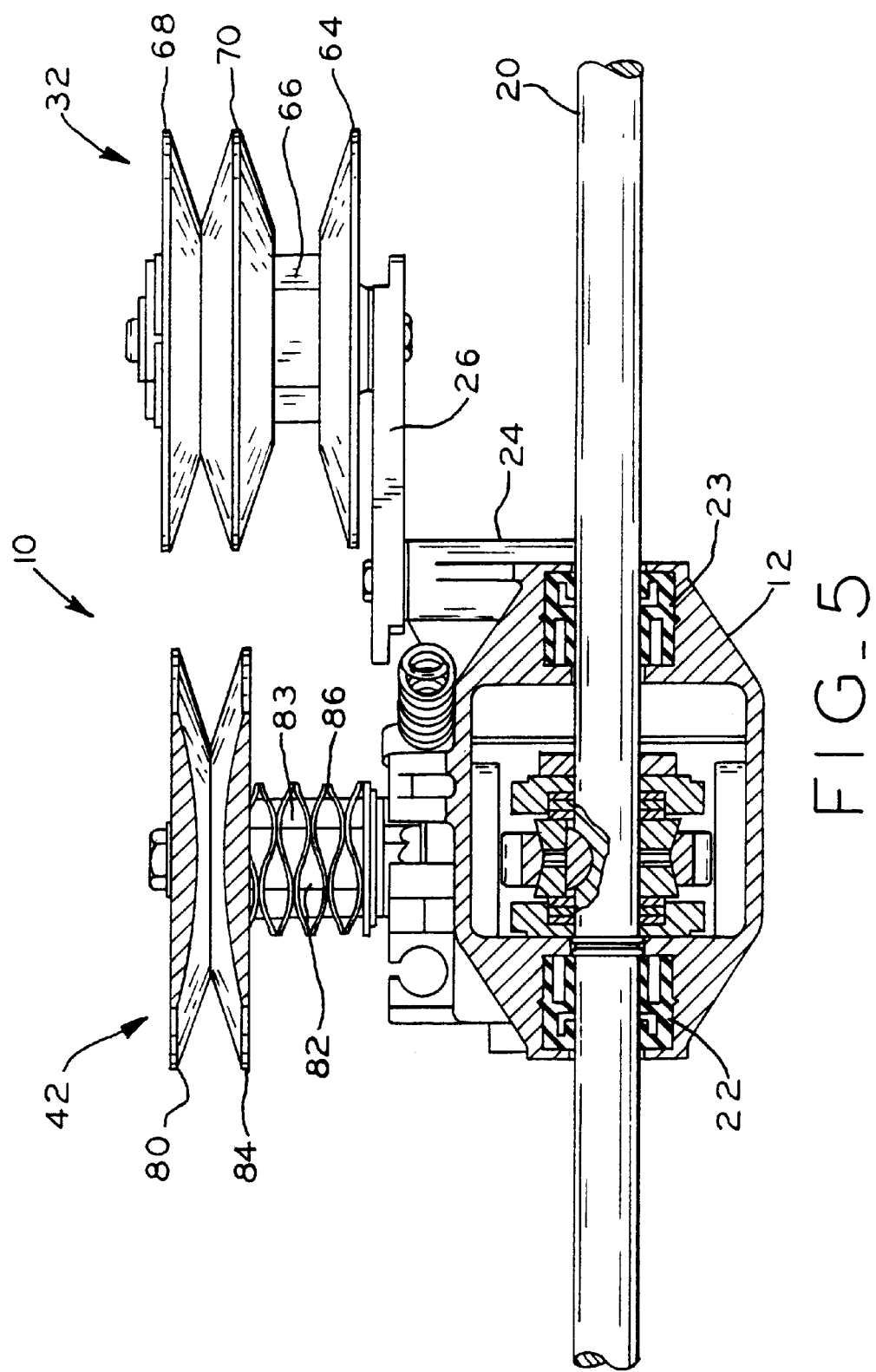
FIG. 5 is a sectional view of the variable speed transmission of FIG. 4 along line 5—5.
Figure 6:
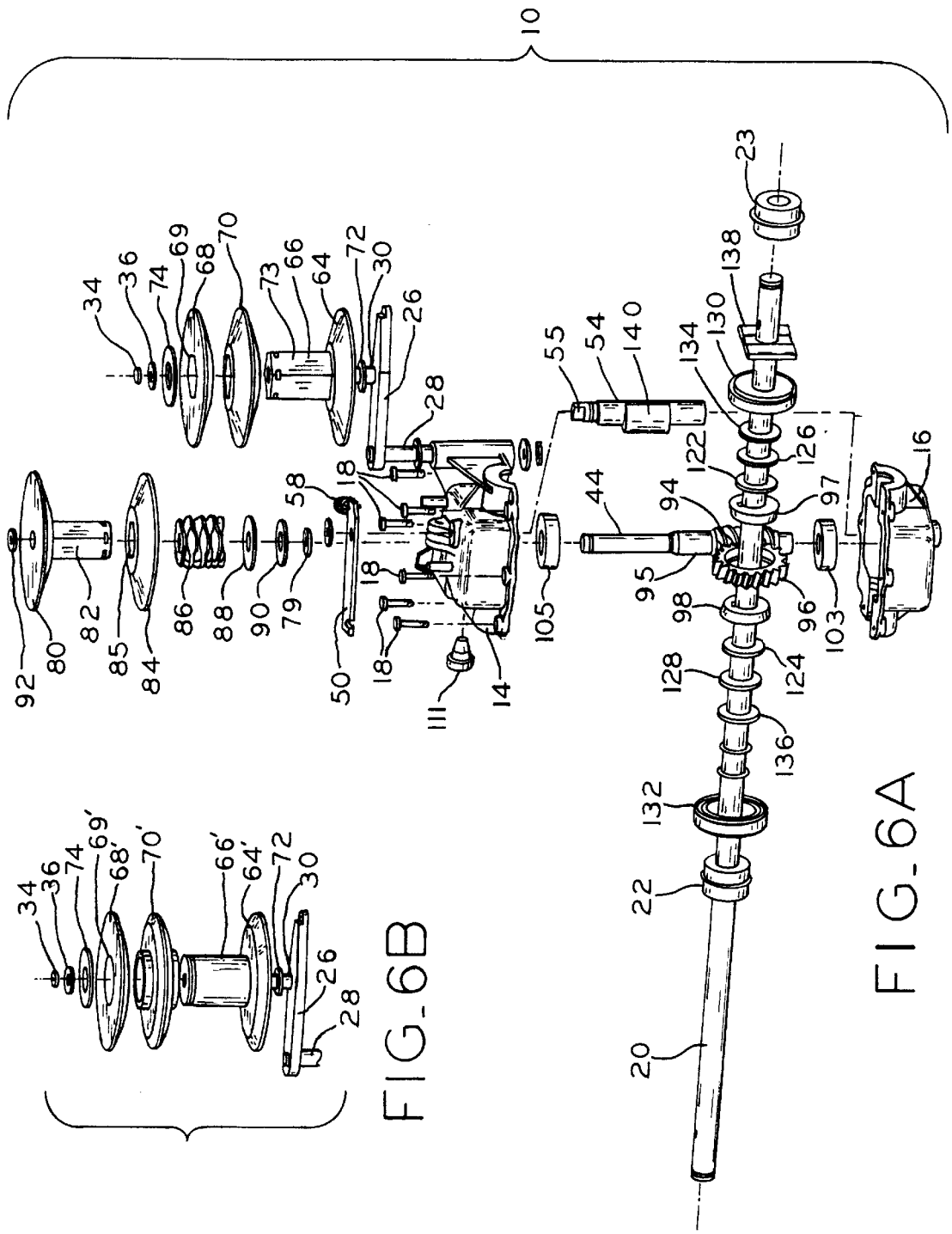
FIG. 6A is an exploded view of the variable speed transmission of FIG. 2.
FIG. 6B is a portion of the exploded view of FIG. 6A showing an alternative embodiment of the pivot pulley assembly.
Figure 7:
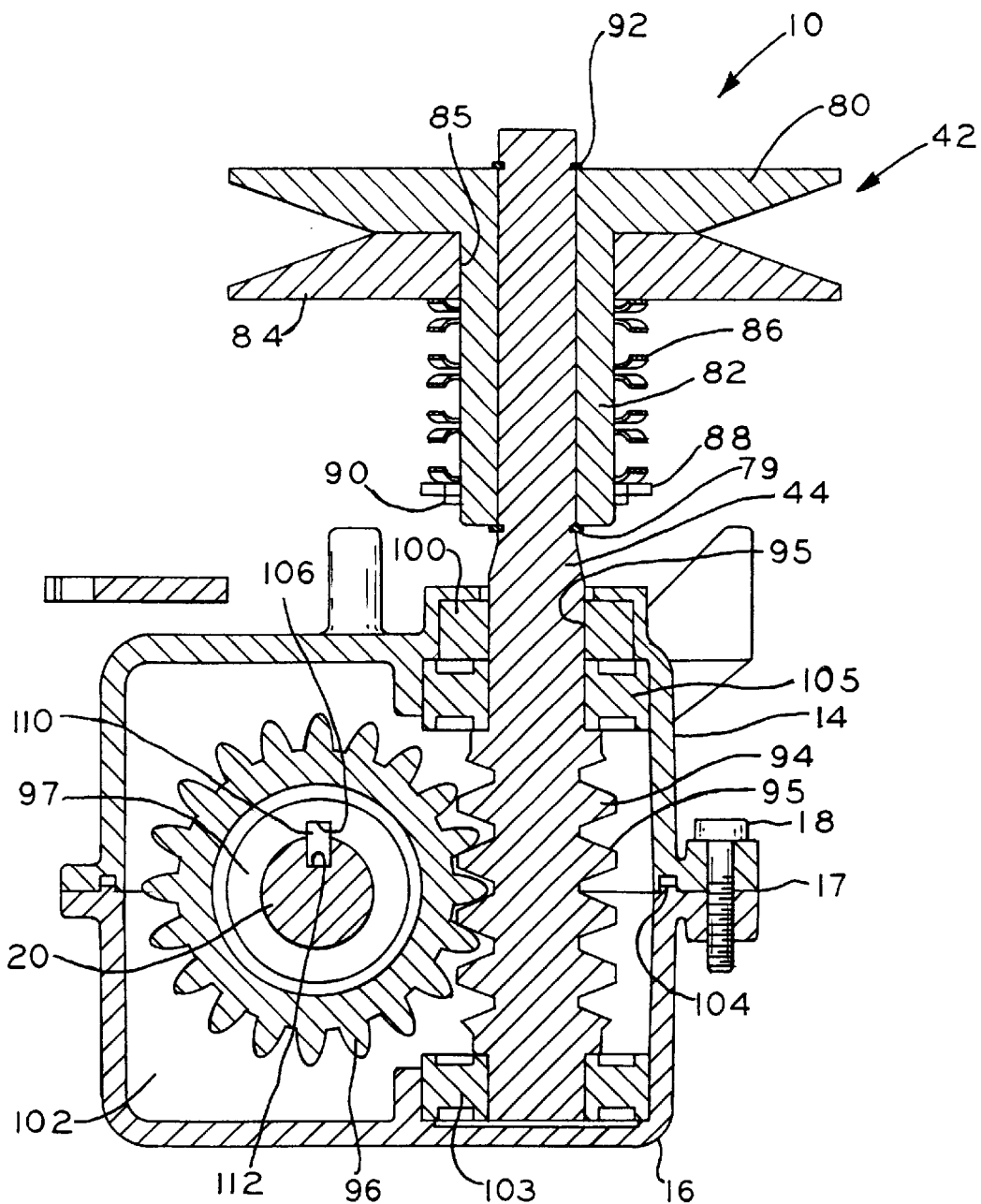
FIG. 7 is a sectional view of the variable speed transmission of FIG. 4 along line 7—7.

Referring now to FIGS. 2, 3, 6A and 7, transmission pulley assembly, or third pulley, 42 includes pulley end 80 rotatably supported upon retaining ring 79 (FIGS. 6A and 7). Retaining ring 79 is engaged within a circumferentially formed groove provided in drive shaft 44. Pulley end 80 is integrally attached to a first end of hexagonally shaped hub 82 (FIGS. 2 and 6A) and a second end of hub 82 slidably extends through hexagonally shaped through hole 85 (FIG. 6A) of pulley end 84. As best seen in FIGS. 2 and 5, compression spring 86 is positioned between pulley end 84 and retaining ring 90 to impart a continuous axial force upon pulley end 84. This axial force is transferred to transmission belt 40 to maintain continuous operative engagement between transmission pulley assembly 42 and transmission belt 40 (FIGS. 8 and 10). Compression spring 86 may be any suitable compression spring, such as a SMALLEY® spring manufactured by the Smalley Steel Ring Company of Wheeling, Ill. Retaining ring 90 is engaged within a circumferential groove provided in hub 82, and thrust washer 88 is positioned between compression spring 86 and retaining ring 90. Second retaining ring 92 is received in a circumferential groove provided in drive shaft 44 and abuts an axial end of hub portion 84 to retain pulley end 80 and hub 82 relative to drive shaft 44.

In an alternative embodiment of pivot pulley assembly 32, shown in FIG. 6B, pivot pulley assembly 32' includes pulley end 64' integrally attached to cylindrical hub 66' and rotatably supported by pulley post 30. Pulley end 68' is affixed to cylindrical hub 66' by hole 69' and is retained on post 30 in a manner similar to that of pulley end 68. Pulley center section 70' is arranged intermediate pulley ends 64' and 68', similar to pulley center section 70, and is mounted on bushing 71. Bushing 71 includes hole 75' through which hub 66' extends such that center section 70' moves axially along hub 66'. In operation, pivot pulley assembly 32' operates in a manner similar to pivot pulley assembly 32 and may replace pivot pulley assembly 32.

With reference to FIGS. 10 and 11, drive belt 38 is engaged with pivot pulley assembly 32, and transmission belt 40 is engaged with both pivot pulley assembly 32 and transmission pulley assembly 42. As drive belt 38 continuously rotates, so does transmission belt 40. With reference to FIG. 10, transmission belt 40 engages pivot pulley assembly 32 at first variable radial position of engagement $R_1$ and transmission pulley assembly 42 at third variable radial position of engagement $R_3$. Drive belt 38 engages pivot pulley assembly 32 at second variable radial position of engagement $R_2$.

Belts 38 and 40 are positioned on pulley assemblies 32 and 42, such that first variable radial position of engagement $R_1$, located between pulley end 68 and pulley center section 70, is measured radially from axis of rotation 61 of pivot pulley assembly 32. Drive belt 38 is engaged with pivot pulley assembly 32 at second variable radial position of engagement $R_2$, located between pulley end 64 and pulley center section 70. Similar to the first variable radial position of engagement $R_1$, second variable radial position of engagement $R_2$ is measured radially from axis of rotation 61 of pivot pulley assembly 32. Since drive belt 38 and transmission belt 40 share axial moveable center section 70, the position of center section 70 axially along hub 66 varies and is generally dependent on the positions and tension of belts 38 and 40. For instance, if drive belt 38 is at its maximum tension and transmission belt is at an intermediate tension, their positions and corresponding tensions then place center section 70 axially closer to pulley end 68.

Rotational speed of transmission pulley 42 may be expressed in terms of $R_1$, $R_2$ and $R_3$. Generally, linear belt velocity, relative to a circular revolving pulley, may be expressed as: $V=2\pi*\omega*R$, where V=belt velocity, $\omega$=angular pulley speed in revolutions per minute (RPM) and R=radial distance of the engagement between the belt and pulley from the respective pulley axis of rotation. With reference to FIGS. 8 and 10, a set of four equations may be identified relating to the speed of the drive and transmission belts. The equations are expressed as follows:

$$V_{drivebelt}=2\pi*\omega_{drive\ pulley}*R_{drive\ pulley/belt}$$

$$V_{drivebelt}=2\pi*\omega_{pivot\ pulley}*R_2$$

$$V_{transmission\ belt}=2\pi*\omega_{pivot\ pulley}*R_1$$

$$V_{transmission\ belt}=2\pi*\omega_{transmission\ pulley}*R_3$$

where:

$V_{drivebelt}$=velocity of drive belt 38.

$V_{transmission\ belt}$=velocity of transmission belt 40.

$\omega_{drive\ pulley}$=angular speed of drive pulley 41.

$\omega_{pivot\ pulley}$=angular speed of pivot pulley 32.

$\omega_{transmission\ pulley}$=angular speed of transmission pulley 42.

$R_{drive\ pulley/drive\ belt}$=radial position of engagement between drive pulley 41 and drive belt 38.

$R_2$=radial position of engagement between pivot pulley 32 and drive belt 38.

$R_1$=radial position of engagement between pivot pulley 32 and transmission belt 40.

$R_3$=radial position of engagement between transmission pulley 42 and transmission belt 40.

The aforesaid equations may be combined to form a single expression:

$$\omega_{transmission\ pulley} = R_{drive\ pulley/drive\ belt} * \omega_{drive\ pulley} * \frac{R_1}{R_2 * R_3}$$

Since drive pulley 41 remains generally constant in radial position relative to drive belt 38 and the angular speed of drive pulley 41 remains generally constant, it should be noted that the angular speed of transmission pulley 42 is generally dependent on $R_1$, $R_2$ and $R_3$. It may be seen, in view of the above equation, that the fastest rotation of transmission pulley 42 is obtained when $R_1$ is at its largest radial position, or far from hub 66, and $R_2$ and $R_3$ are at their smallest radii of engagement with the respective belts, or close to hub 66 and hub 82, (FIGS. 8 and 10). Conversely, the slowest rotation of transmission pulley 42 is obtained when $R_1'$ is at its smallest radial position, or close to hub 66, and $R_2'$ and $R_3'$ are at their largest radii of engagement with the respective belts, or far from hub 66 and hub 82 (FIGS. 9 and 11). It will be understood by those having ordinary skill in the art that this variable speed transmission not only operates in conformity with the fastest and slowest speed setting, as set forth above, but also provides infinitely variable speed settings therebetween. Selective rotation of pivot arm 26 by operator engagement of manual control mechanism 6 connected to hole 63 of pivot arm 26, provides varying axle speeds ranging from slowest (FIGS. 9 and 11) to fastest (FIGS. 8 and 10).

It may be seen that movement of pivot arm 26 in the direction indicated by arrow 35 (FIG. 8) causes immediate loosening or "slack" in both belts 38 and 40. The aforesaid slack in transmission belt 40 immediately dissipates as pulley end 84 is urged toward pulley end 80 by spring 86, which causes an increase in radial position of engagement $R_3$ of transmission belt 40. The slack in drive belt 38 immediately dissipates as drive belt 38 conforms to a new, larger radial position of engagement $R_2$ of drive belt 38 engaged with pivot pulley assembly 32. Both center section 70 of pivot pulley assembly 32 and pulley end 84 of transmission pulley assembly 42 are "responsive" (i.e., provide an equilibrium position for belts 38 and 40 relative to pulley assemblies 32 and 42) to selective rotation of pivot arm 26.

As shown in FIGS. 8 and 9, transmission pulley 42 is located to the left of pivot pulley assembly 32. As such, drive belt 38 rotates in the clockwise direction, thus creating position of radial engagement $R_2$ at the point where drive belt 38 contacts pivot pulley assembly 32. The distance between $R_2$ and pivot post 28 is equivalent to a moment arm $D_2$ of the pivot pulley assembly 32. As shown, moment arm $D_2$ is relatively long, thereby enabling a greater control of transmission 10 through easier movement of pivot arm 26 and pivot pulley assembly 32 when manually actuated due to a decrease in the amount of force required to rotate pivot arm 26. Additionally, using the structure shown allows for the usage of a smaller electronically controlled linear actuator, since less force is needed to rotate pivot arm 26. The structure shown is advantageous over a structure in which transmission pulley 42 would be located to the right of pivot pulley assembly 32. In that structure, the distance between pivot post 28 and $R_2$, or moment arm $D_1$, is much less, thereby making movement of pivot pulley assembly 32 more difficult since a larger amount of force would be necessary to rotate pivot arm 26 whether using manual or electronic means.

Figure 12:
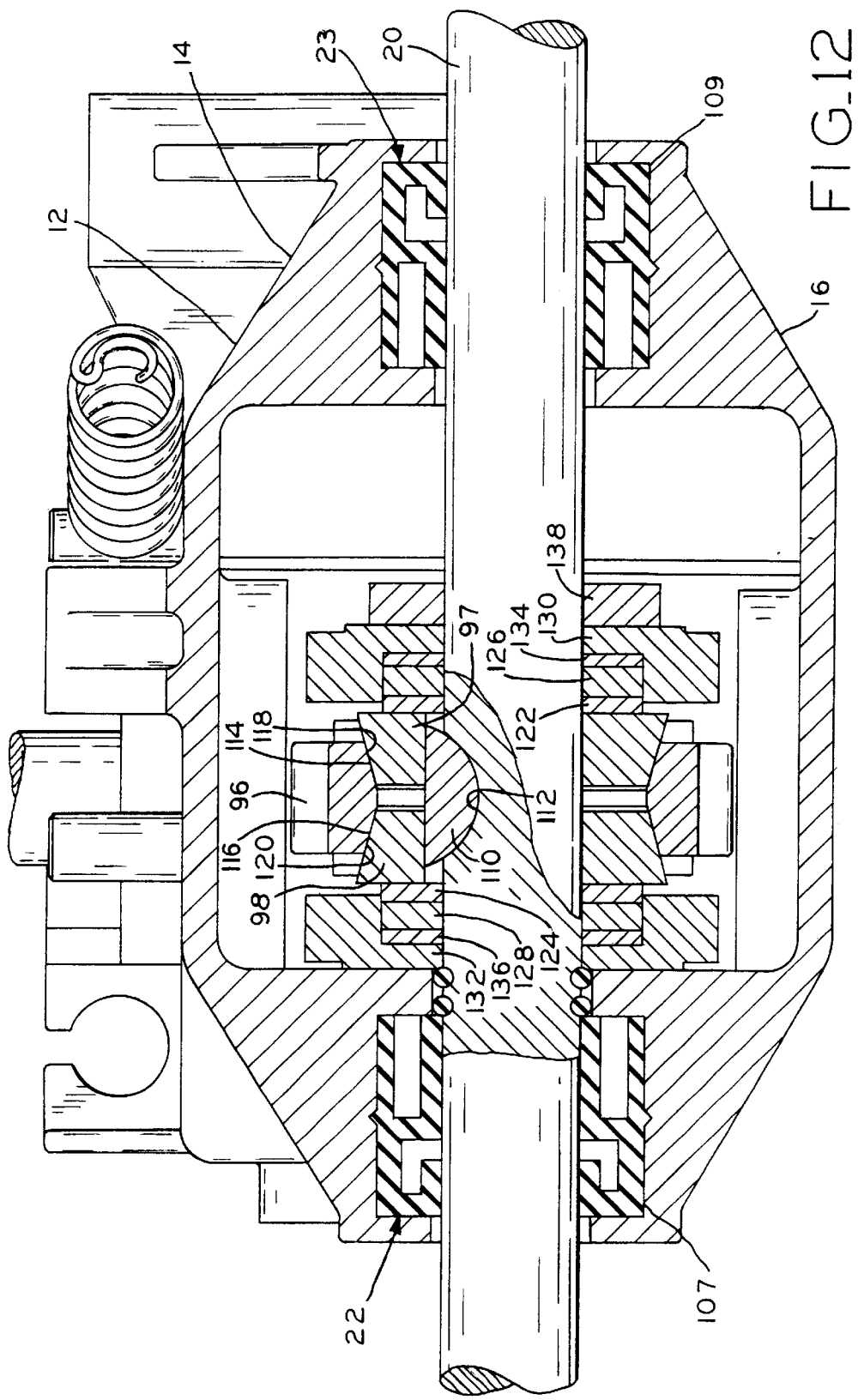
FIG. 12 is an enlarged view of encircled area 12 of FIG. 11, showing the worm drive and axle support structure.

Referring to FIG. 7, housing 12 of transmission 10 includes sealed internal cavity 102, provided with lubrication oil (FIGS. 7 and 12). Shaft seal 100 is captured within a recessed portion of housing half 14 to seal surface 95 of drive shaft 44 and enclose lubrication oil provided in cavity 102 of housing 12 (FIG. 7). Referring to FIG. 12, a pair of seals 107 and 109 provide a lubrication barrier between axle 20 and housing 12 and are included in each respective sleeve assembly 22 and 23 to prevent oil within cavity 102 from escaping housing 12. Housing seal 104 is provided between housing halves 14 and 16 to seal housing cavity 102 at interface 17 (FIG. 7). Oil fill plug 111 is removably attached to housing 12 to allow for introduction or removal of oil (FIG. 6A).

Transmission 10 includes external actuator lever 50 which when rotated by an operator through cable linkage 11 (FIGS. 1A and 1B), causes the transmission drive shaft 44 to operatively engage axle 20. Referring to FIGS. 6A and 7, drive shaft 44 includes worm portion 94 located on outer surface 95 thereof, and intermeshed with worm gear 96. A pair of ball bearing assemblies 103 and 105 are respectively fitted within respective housing halves 14 and 16 to rotatably support drive shaft 44. Referring to FIGS. 6A and 12, a pair of cone clutches 97 and 98 are rotationally fixed on axle 20 by having notches 106 and 108 provided therein and engaged with Woodruff key 110 (FIGS. 7 and 12). Woodruff key 110 is engaged within notch 112 machined into axle 20 by a broaching operation, for example, as is customary. Cone clutches 97 and 98 respectively include frustoconical surfaces 114 and 116 which engage complementary frustoconical surfaces 118 and 120 provided on lateral sides of worm gear 96 (FIG. 12). A first pair of washers 122 and 124 are in contact with respective outer lateral surfaces of cone clutches 97 and 98 and a pair of thrust bearings 126 and 128 contact respective washers 122 and 124. A second pair of washers 134 and 136 contact respective thrust bearings 126 and 128. Additionally, a pair of spacers 130 and 132 are positioned on outermost lateral surfaces of washers 134 and 136 and an actuator plate 138 is positioned intermediate spacer 130 and sleeve assembly 23. Actuator plate 138 is engaged by cam portion 140 (FIG. 6A) as actuator rod 54 is selectively rotated by an operator through cable linkage 11 (FIGS. 1A and 1B) attached to actuator lever 50.

In operation, an inward axial force, provided by actuator plate 138, is transmitted to cone clutches 97 and 98 causing frustoconical surfaces 114 and 116 of respective cone clutches 97 and 98 to respectively engage frustoconical surfaces 118 and 120 of worm gear 96. Rotation of the actuator rod operatively engages the worm gear and axle 20, through the clutch/worm gear interface, and axle 20 is thus driven by rotating drive shaft 44. As an alternative to disengagement of transmission 10, via selective rotation of actuator lever 50, it is envisioned that pivot arm 26 may be rotated to a position corresponding to a fully slack belt 40 effectively producing insubstantial rotation of belt 40, and thus insubstantial rotation of transmission pulley 42.

Figure 13:
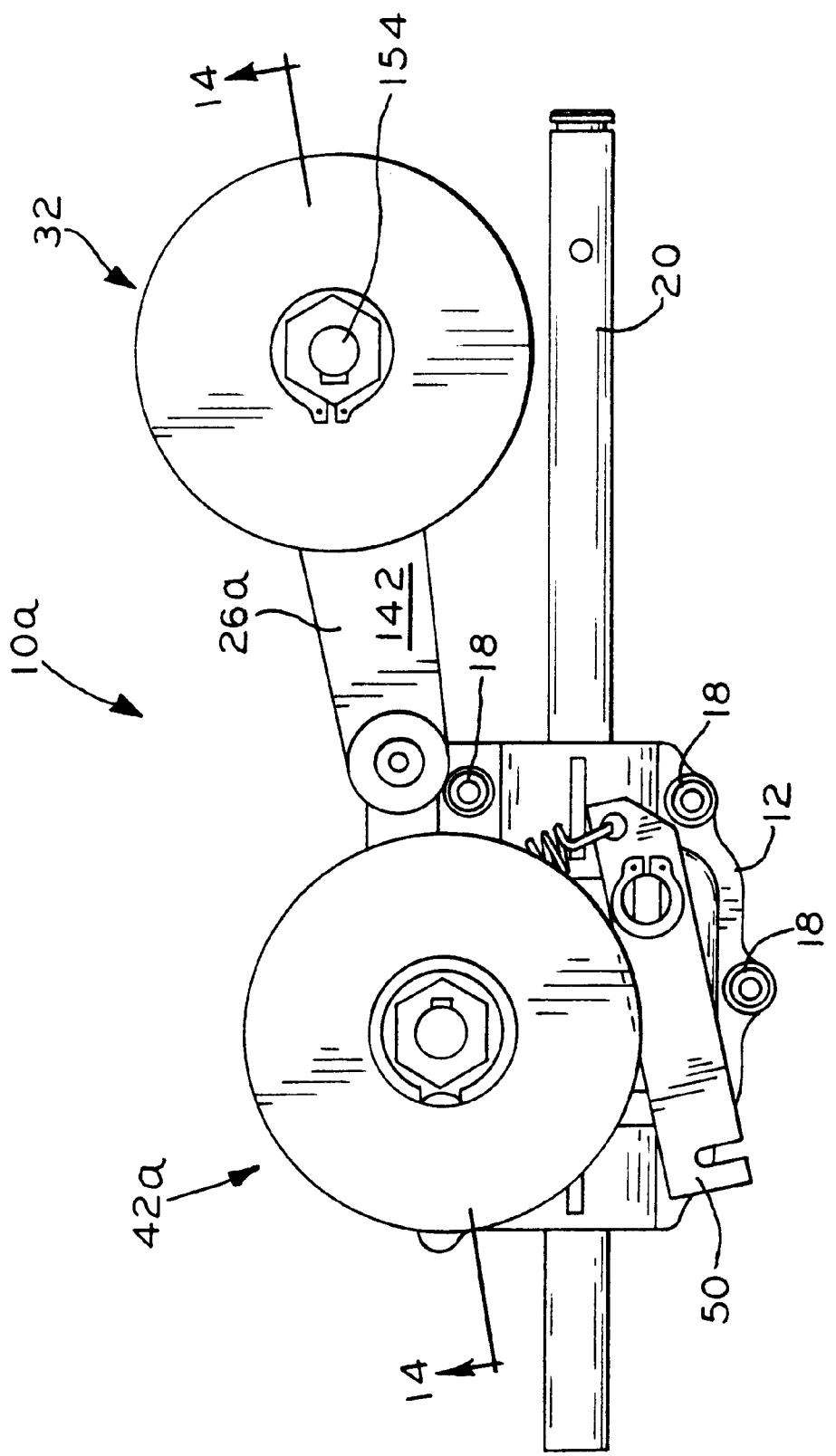
FIG. 13 is a top plan view of a second embodiment of a variable speed transmission in accordance with the present invention.
Figure 14:
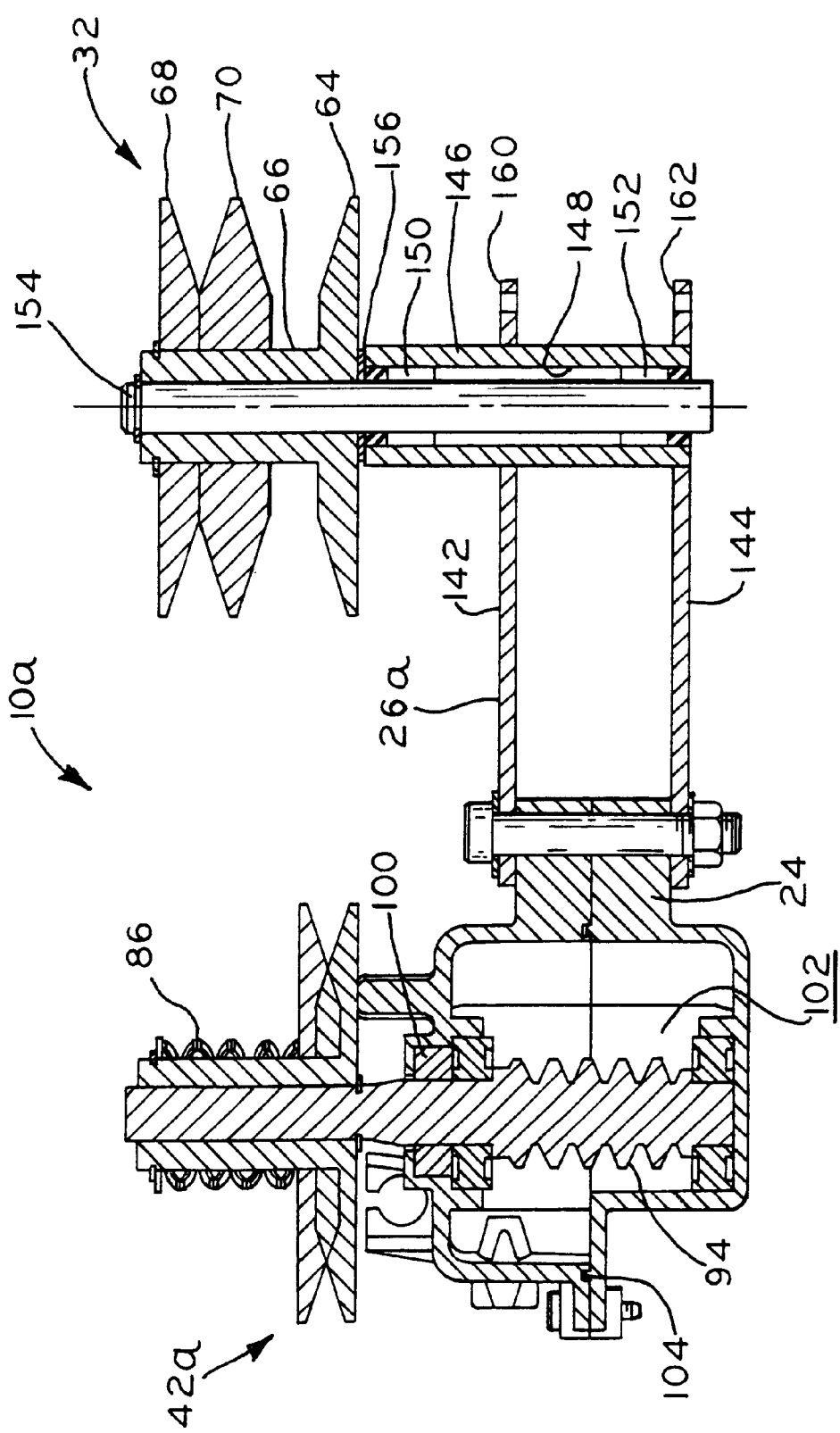
FIG. 14 is a sectional view of the variable speed transmission of FIG. 13 taken along line 14—14.
Figure 16:
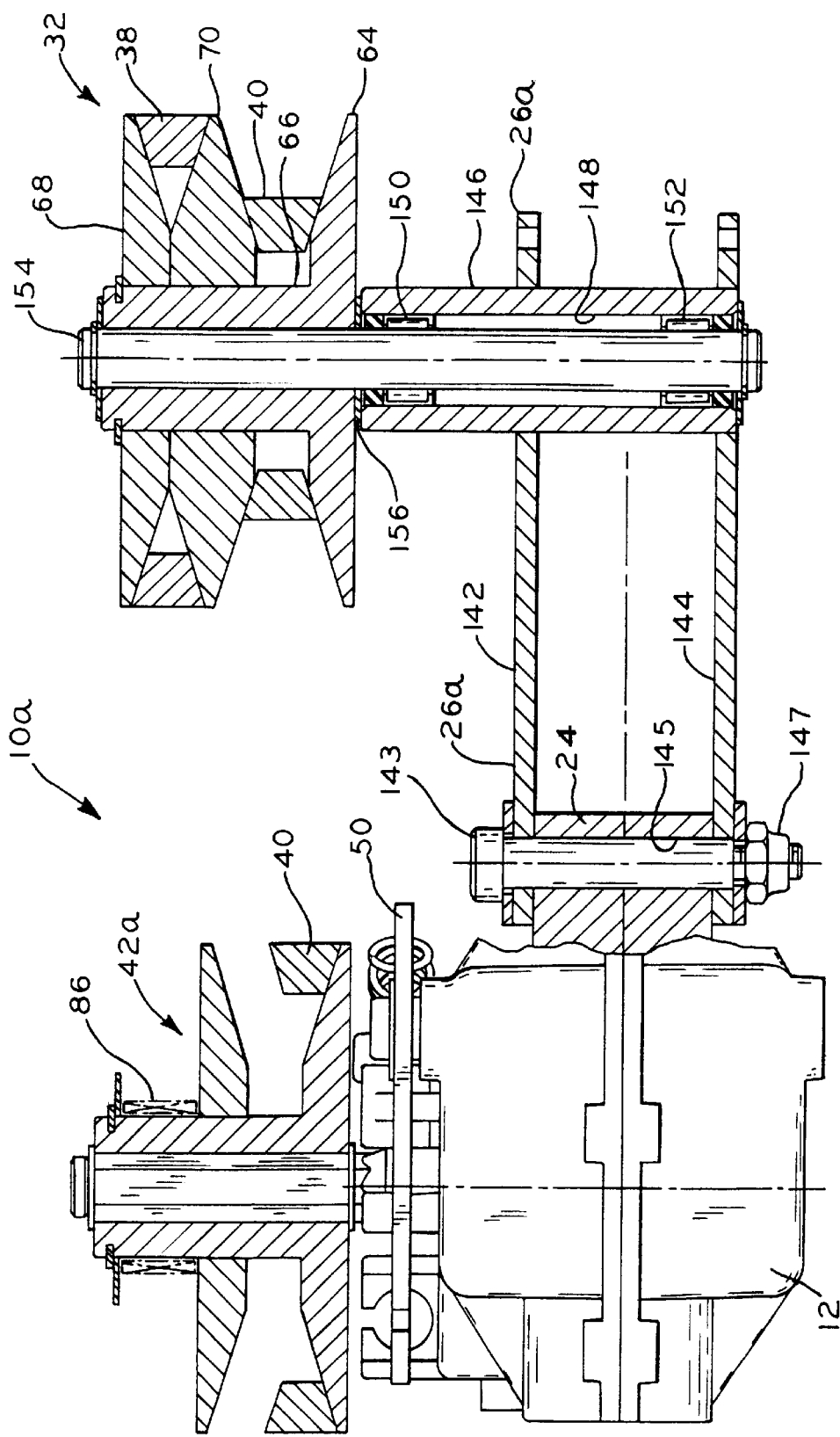
FIG. 16 is an elevational view of the variable speed transmission of FIG. 13 partially in section.

FIGS. 13, 14, and 16 illustrate a second embodiment of variable speed transmission 10 wherein elements, which are similar to the first embodiment, are denoted with the letter "a". Transmission 10a differs from the first embodiment transmission in several respects, one of which includes pivot arm 26a having a pair of arm members 142 and 144 each pivotally attached to boss 24. Bolt 143 extends through arm members 142 and 144 and hole 145 of boss 24 to rotatably support pivot arm 26a (FIG. 16). Lock-nut 147 is threaded upon bolt 143 to retain bolt 143 within boss 24. Sleeve 146 is rigidly attached to pivot arm 26a by, for example being welded to arm members 142 and 144 and includes through hole 148. A pair of bearing assemblies 150 and 152 are located within hole 148 of sleeve 146 to rotatably support shaft 154, which extends outwardly from sleeve 146 and is rigidly attached to hub 66. Positioned between a butt end of sleeve 146 and pulley end 64 is thrust bearing 156 which affords additional rotatable support of transmission pulley assembly 32.

Referring to FIG. 14, transmission 10a includes modified transmission pulley 42a which, relative to transmission pulley 42 (FIGS. 1–3), is inverted. Pivot pulley assembly 32 is driven by drive belt 38, at an upper portion 158 of pivot pulley assembly 32 and transmission belt 40 is positioned between center section 70 and pulley end 64 (FIG. 16). Axle speed is selected, through operator rotation of pivot arm 26a, as described above, via cable 8 (FIGS. 1A and 1B). Pivot arm 26a includes a pair of holes 160 and 162 which accommodate connection with the cable linkage.

Figure 15:
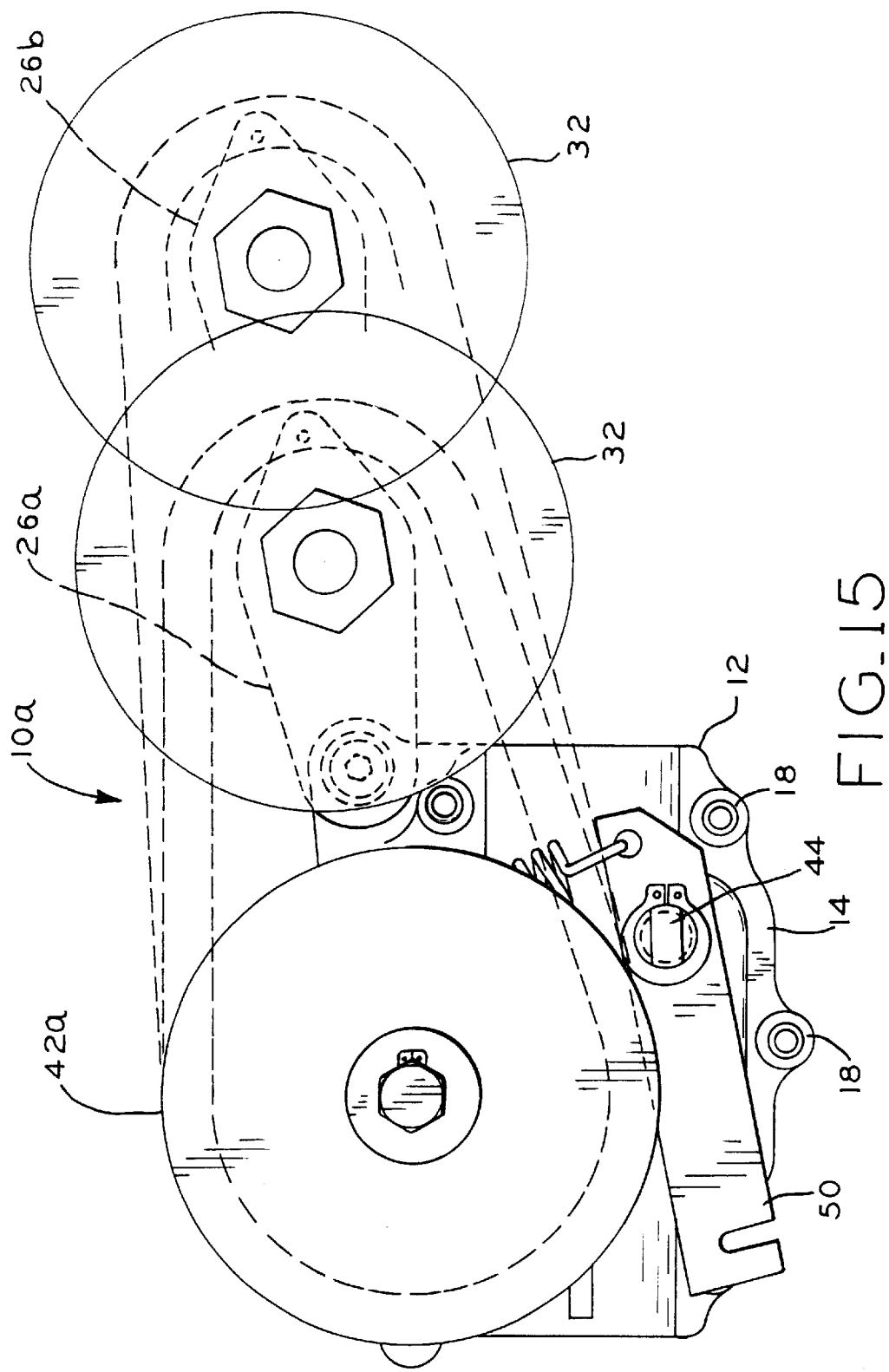
FIG. 15 is a top plan view of a third embodiment of a variable speed transmission in accordance with the present invention, including the transmission of FIG. 13 having an alternative pivot arm assembly.

Referring to FIG. 15, a third embodiment of a variable speed transmission is shown having lengthened pivot arm 26b relative to pivot arm 26a and shown superimposed thereover. Pivot arm 26b provides an increased range of axle speed control over pivot arm 26a by simply having an increased length.

Figure 17:
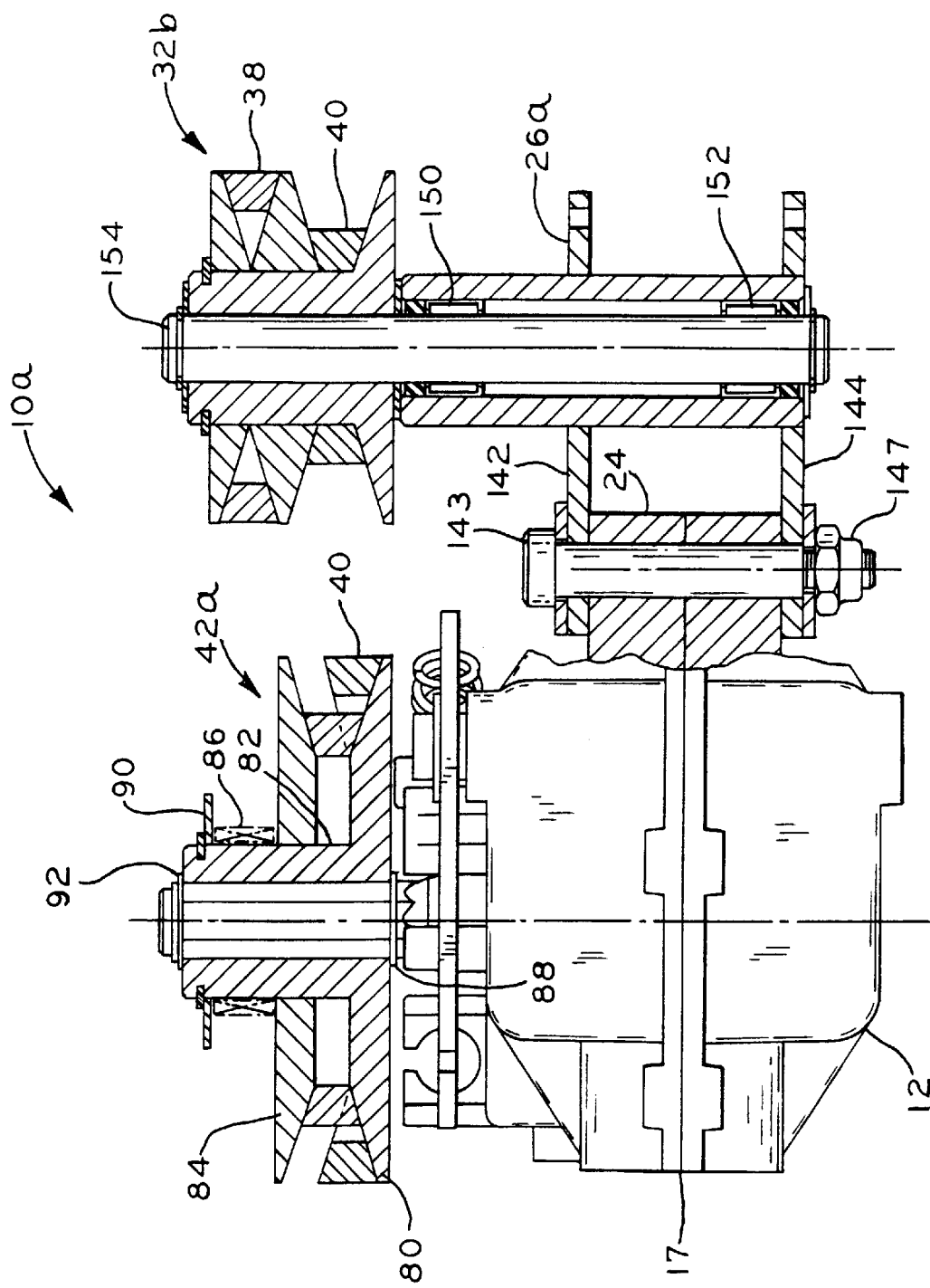
FIG. 17 is an elevational view of a fourth embodiment of a variable speed transmission in accordance with the present invention partially in section and showing a modified pivot pulley assembly.

A fourth embodiment of a variable speed transmission is shown in FIG. 17 and includes modified pivot pulley assembly 32b. Generally, pivot pulley assembly 32b includes smaller diameter pulleys, relative to pivot pulley assembly 32a, which provides greater axle speeds corresponding to a maximum radial position of engagement between belt and respective pulley. For example, when used with reduced speed power sources, the smaller diameter pivot pulley assembly 32b, in combination with transmission pulley assembly 42b, would provide an acceptable range of axle speeds. Thus, it is envisioned that a variety of somewhat simple modifications to variable speed transmission 10a, will allow a manufacturer a variety of power source and transmission combinations using a single housing and axle assembly.

Figure 18:
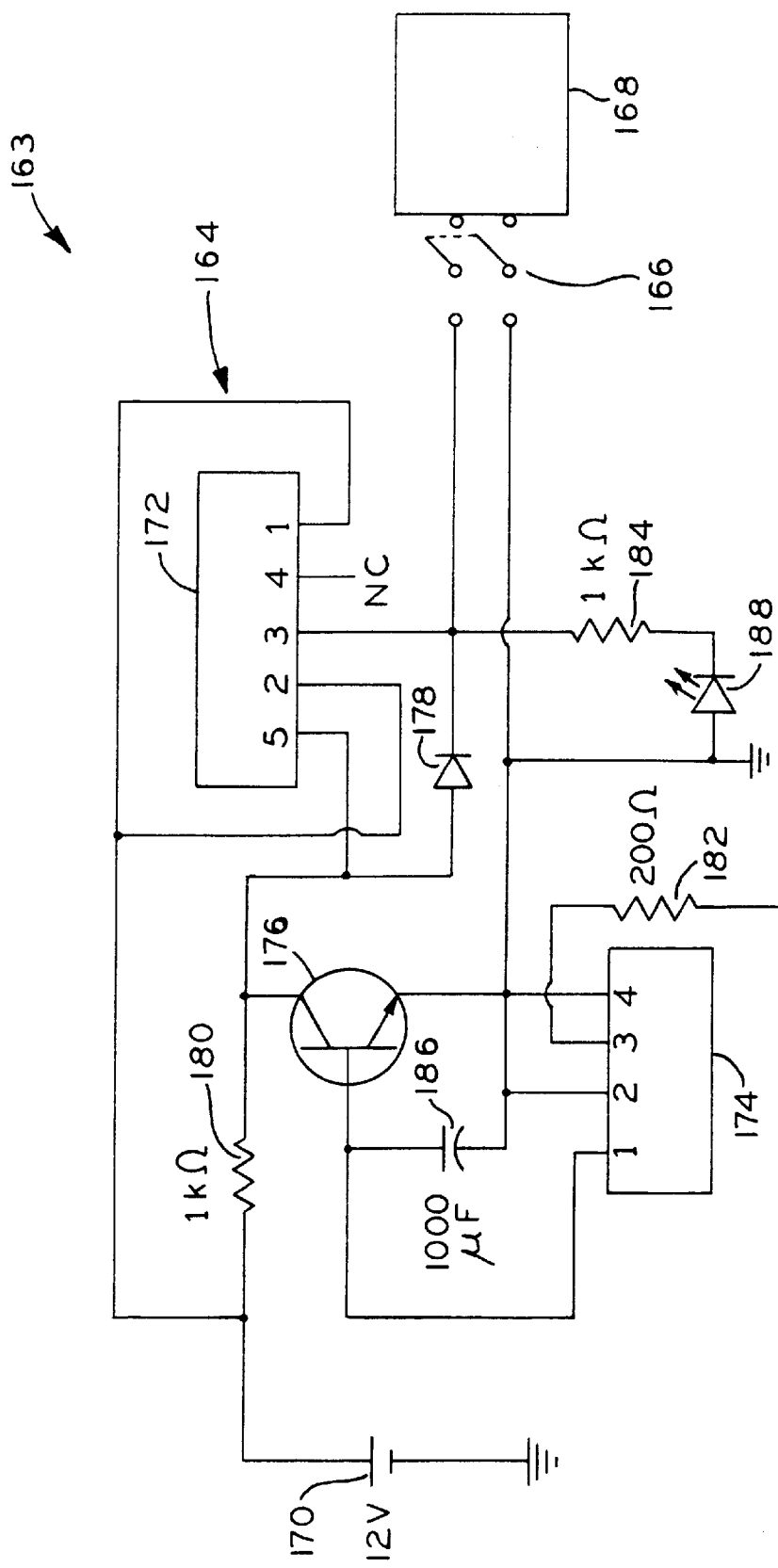
FIG. 18 is a circuit schematic of an electronic shift control for a variable speed transmission in accordance with the present invention.

Referring now to FIG. 18, electronic speed control mechanism 163 for transmission 10 is shown as including electric control circuit 164 in communication with a coil (not shown) on engine 5, switch 166 connected to linear actuator 168, and battery 170. Linear actuator 168 is used to move pivot arm 26 to vary the speed of transmission 10, as described above. Linear actuator 168 includes a rod (not shown) which may be either extended or retracted between variable first and second positions to create the movement at pivot arm 26. Linear actuator 168 may be any suitable design for moving a pivot arm, such as, for example, the Electrak E050 Linear Actuator, manufactured by Warner Electric of South Beloit, Ill.

Switch 166 provides electrical communication between electronic control circuit 164 and linear actuator 168, and is of any suitable design, such as, for example, those manufactured by EATON Cutler-Hammer. As shown, switch 166 is a double-pole, single throw switch, although switch 166 may be any other type of switch which would provide a connection between circuit 164 and linear actuator 168. In addition to providing electrical communication between circuit 164 and linear actuator 168, switch 166, when closed, allows an operator to change the polarity of linear actuator 168 in order to extend or retract the rod.

Electronic control circuit 164 includes relay 172, such as, for example, OEG relay part number OUDH-S-112D manufactured by Tyco Electronics of Japan; rectifier 174, such as, for example, a Kimball-Elka model KBL02 rectifier; transistor 176, such as, for example, the Motorola 2N3904, diode 178, resistors 180, 182, and 184, and capacitor 186. It should be noted that transistor 176 is depicted as a Bipolar Junction Transistor (BJT), and terminology describing the same is used; however, transistor 176 may be a Field Effect Transistor (FET), such as a MOSFET or JFET. Additionally, light-emitting diode (LED) 188 is included to provide a display to the operator that electronic control circuit 164 is being powered. Battery 170 is provided to power relay 172 and transistor 176. A cover (not shown) may be used to cover many of the components of electronic control circuit 164 with LED 188 being mounted in such a manner as to allow the operator to easily view LED 188.

In operation, an alternating current signal is sent from engine 5 by an electrical connection to the coil on the associated electric motor. When the engine is operating, such a signal will be generated, whereas when the engine is not operating, there will be no signal. From the engine, the signal passes through second resistor 182 and is sent to terminal 3 of rectifier 174, where it is rectified, in a known manner. From the rectifier, the signal is sent to capacitor 186 where the signal is filtered for noise. Both the filtered signal from capacitor 186 and the unfiltered signal from rectifier 174 are then sent to the base of transistor 176. At the same time, current is flowing through first resistor 180 and is being provided to the collector of transistor 176, and input terminals 2, 5, and 1 of relay 172. From the emitter of transistor 176, current is provided to the negative side of switch 166 and to ground.

Output 3 of relay 172, with the current flowing through diode 178, provides current to the positive side of switch 166 to allow full operation of switch 166. Additionally, a portion of the current is provided to third resistor 184 and LED 188 to light LED 188 to notify the operator that electronic control circuit 164 is in working order. Once both the positive and negative side of switch 166 are powered, then the operator may operate switch 166 and linear actuator 168 in a manner consistent with the operation of the variable transmission, as described above.

When the engine is not operating, there is no signal being provided, thus there is no power to switch 166, and linear actuator 168 may not be operated, thereby preventing an operator from attempting to vary the pulley diameters and preventing variation of the speed in the transmission. As such, binding of the variable speed mechanism is prevented, thereby eliminating potential damage to the variable speed transmission upon starting the implement.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A variable speed transmission, comprising:

a housing;

a drive shaft having an axis of rotation and rotatably supported in said housing;

an output shaft having an axis of rotation and rotatably supported in said housing, said output shaft operatively connected to said drive shaft;

a first pulley and a second pulley both having a common axis of rotation, said first pulley and said second pulley formed by a first pulley end, a second pulley end, and a pulley center section; said first pulley end, said second pulley end, and said pulley center section rotatable about said common axis of rotation; said pulley center section disposed intermediate said first pulley end and said second pulley end, said second pulley end substantially immovable relative to said first pulley end along said common axis of rotation, said pulley center section movable relative to said first pulley end and said second pulley end along said common axis of rotation, whereby said first pulley and said second pulley each have a variable pitch diameter, changes in said first and second pulley variable pitch diameters being at all times inversely proportional;

a third pulley having an axis of rotation and rotatably attached to said drive shaft; and a belt, said third pulley and one of said first and said second pulleys being in engagement through said belt.

2. The transmission of claim 1, wherein said output shaft is an axle, said axle axis of rotation being perpendicularly disposed to said drive shaft axis of rotation, said axle being selectively operatively connected to said drive shaft.

3. The transmission of claim 2, further comprising a clutch mechanism, said axle being selectively operatively connected to said drive shaft through said clutch mechanism.

4. The transmission of claim 1, further comprising a pivot pulley assembly which comprises said first and said second pulleys, said pivot pulley assembly further comprising a pivot arm pivotably attached to said housing, said first and second pulleys being rotatably attached to said pivot arm.

5. The transmission of claim 4, wherein said axes of rotation of said first and third pulleys are parallel but separated.

6. The transmission of claim 5, wherein said pivot arm is manually pivoted relative to said housing, the distance between said axes of rotation of said first and third pulleys is changed in response to movement of said pivot arm.

7. The transmission of claim 6, wherein said first and said second pulley pitch diameters are varied in response to movement of said pivot arm, whereby a drive ratio between said first and said second pulleys is varied.

8. The transmission of claim 5, further comprising an electric linear actuator operatively connected to said pivot arm, said linear actuator having a first position and a variable second position.

9. The transmission of claim 8, wherein said pivot arm has a first position when said linear actuator is in its said first position, and said pivot arm has a second position when said linear actuator is in its said second position.

10. The transmission of claim 9, wherein said first and said second actuator positions are variable and said first and second pivot arm positions are variable, whereby the drive ratio between said first and second pulleys is variable.

11. The transmission of claim 1, wherein said third pulley has a variable pitch diameter which is varied in response to changes in the pitch diameter of said one of said first and second pulleys.

12. The transmission of claim 11, wherein a drive ratio between said third pulley and said one of said first and second pulleys is variable.

13. An implement comprising:
a deck;
an engine attached to said deck and having a pulley;
an axle rotatably supported by said deck;
a ground engaging wheel driven by said axle; and
a variable speed transmission attached to said deck and comprising:
a housing,
a drive shaft having an axis of rotation and rotatably supported in said housing, said drive shaft being operatively connected to said axle,
a first variable pitch diameter pulley and a second variable pitch diameter pulley, said first variable pitch diameter pulley and said second variable pitch diameter pulley having a common axis of rotation, said first variable pitch diameter pulley having a first variable pitch diameter and said second variable pitch diameter pulley having a second variable pitch diameter, said first and said second variable pitch diameters being in an inversely proportional relationship,
a third pulley having an axis of rotation, said drive shaft axis of rotation substantially collinear with said third pulley axis of rotation, said third pulley rotatably fixed to said drive shaft whereby said third pulley rotates with said drive shaft, and
a transmission belt, said third pulley and one of said first and said second variable pitch diameter pulleys being in engagement though said belt; and
a drive belt extending between said engine pulley and the other of said first and second pulleys.

14. The implement of claim 13, further comprising a pivot pulley assembly which comprises said first and said second pulleys, said pivot pulley assembly further comprising a pivot arm pivotably attached to said housing, said first and second pulleys being rotatably attached to said pivot arm.

15. The implement of claim 14, further comprising a linear actuator operatively connected to said pivot arm, said linear actuator being electronically moved, wherein said pivot arm is pivoted by said linear actuator and said pivot pulley assembly is moved in response to rotational movement of said pivot arm.

16. The implement of claim 14, wherein said first and said second pulley pitch diameters are varied in response to movement of said pivot arm, whereby a drive ratio between said first and said second pulleys is varied.

17. The implement of claim 16, wherein said engine maintains a substantially constant speed, and said third pulley has a speed which is varied in response to variation of said first and said second variable pitch diameters.

18. The implement of claim 17, wherein said third pulley has a variable pitch diameter, said third pulley having a speed which is varied in response to variation in said third pulley pitch diameter.

19. A variable speed transmission, comprising:
a housing;
a drive shaft having an axis of rotation and rotatably supported in said housing;
an output shaft having an axis of rotation and rotatably supported in said housing, said output shaft operatively connected to said drive shaft;
a first pulley and a second pulley both having a common axis of rotation;
pitch means for varying the pitch diameter of said first pulley and said second pulley such that changes in said first and second pulley variable pitch diameters are at all times inversely proportional;
a third pulley having an axis of rotation and rotatably attached to said drive shaft; and
a belt, said third pulley and one of said first and said second pulleys being in engagement through said belt.

20. The transmission of claim 19, further comprising a pivot pulley assembly which comprises said first and said second pulleys, said pivot pulley assembly further comprising a pivot arm pivotably attached to said housing, said first and second pulleys being rotatably attached to said pivot arm.

21. The transmission of claim 20, wherein said axes of rotation of said first and third pulleys are parallel but separated.

22. The transmission of claim 21, wherein said pivot arm is manually pivoted relative to said housing, the distance between said axes of rotation of said first and third pulleys is changed in response to movement of said pivot arm.

23. The transmission of claim 22, wherein said first and said second pulley pitch diameters are varied in response to movement of said pivot arm, whereby a drive ratio between said first and said second pulleys is varied.

24. The transmission of claim 19, wherein said pitch means comprises:
a first pulley end, a second pulley end and a pulley center section; said first pulley end, said second pulley end and said pulley center section rotatable about said common axis of rotation; said pulley center section disposed intermediate said first pulley end and said second pulley end, said second pulley end substantially immovable relative to said first pulley end along said common axis of rotation, said pulley center section immovable along said common axis of rotation, said first pulley end and said second pulley end movable together along said common axis of rotation.

25. The transmission of claim 19, wherein said output shaft is an axle, said axle axis of rotation being perpendicularly disposed to said drive shaft axis of rotation, said axle being selectively operatively connected to said drive shaft.

26. The transmission of claim 25, further comprising a clutch mechanism, said axle being selectively operatively connected to said drive shaft through said clutch mechanism.

27. The transmission of claim 19, wherein said pitch means comprises:
    a first pulley end, a second pulley end and a pulley center section; said first pulley end, said second pulley end and said pulley center section rotatable about said common axis of rotation; said pulley center section disposed intermediate said first pulley end and said second pulley end, said second pulley end substantially immovable relative to said first pulley end along said common axis of rotation, said second pulley end and said first pulley end substantially immovable along said common axis of rotation, said pulley center section movable along said common axis of rotation.

28. The transmission of claim 19, wherein said third pulley has a variable pitch diameter which is varied in response to changes in the pitch diameter of said one of said first and second pulleys.

29. The transmission of claim 28, wherein a drive ratio between said third pulley and said one of said first and second pulleys is variable.

30. A variable speed transmission, comprising:
    a housing;
    a drive shaft having an axis of rotation and rotatably supported in said housing;
    an output shaft having an axis of rotation and rotatably supported in said housing, said output shaft operatively connected to said drive shaft;
    a first pulley and a second pulley both having a common axis of rotation, said first pulley and said second pulley formed by a first pulley end, a second pulley end, and a pulley center section; said first pulley end, said second pulley end, and said pulley center section rotatable about said common axis of rotation; said pulley center section disposed intermediate said first pulley end and said second pulley end, said second pulley end substantially immovable relative to said first pulley end along said common axis of rotation, said pulley center section movable relative to said first pulley end and said second pulley end along said common axis of rotation, whereby said first pulley and said second pulley each have a variable pitch diameter, changes in said first and second pulley variable pitch diameters being at all times inversely proportional;
    a third pulley having an axis of rotation and rotatably attached to said drive shaft;
    a belt, said third pulley and one of said first and said second pulleys being in engagement though said belt; and
    a clutch mechanism, said output shaft selectively operatively connected to said drive shaft through said clutch mechanism.

31. The transmission of claim 30, wherein said clutch mechanism comprises a friction clutch.

32. The transmission of claim 31, wherein said friction clutch comprises a cone clutch.

33. The transmission of claim 30, wherein said output shaft is an axle, said axle axis of rotation being perpendicularly disposed to said drive shaft axis of rotation.

34. The transmission of claim 30, further comprising a pivot pulley assembly which comprises said first and said second pulleys, said pivot pulley assembly further comprising a pivot arm pivotably attached to said housing, said first and second pulleys being rotatably attached to said pivot arm.

35. The transmission of claim 34, wherein said axes of rotation of said first and third pulleys are parallel but separated.

36. The transmission of claim 35, wherein said pivot arm is manually pivoted relative to said housing, the distance between said axes of rotation of said first and third pulleys is changed in response to movement of said pivot arm 37. The transmission of claim 36, wherein said first and said second pulley pitch diameters are varied in response to movement of said pivot arm, whereby a drive ratio between said first and said second pulleys is varied.

38. The transmission of claim 30, wherein said third pulley has a variable pitch diameter which is varied in response to changes in the pitch diameter of said one of said first and second pulleys.

39. The transmission of claim 38, wherein a drive ratio between said third pulley and said one of said first and second pulleys is variable.

40. A variable speed transmission, comprising:
    a housing;
    a drive shaft having an axis of rotation and rotatably supported in said housing;
    an output shaft having an axis of rotation and rotatably supported in said housing, said output shaft operatively connected to said drive shaft;
    a first pulley and a second pulley both having a common axis of rotation;
    pitch means for varying the pitch diameter of said first pulley and said second pulley such that changes in said first and second pulley variable pitch diameters are at all times inversely proportional;
    a third pulley having an axis of rotation and rotatably attached to said drive shaft;
    a belt, said third pulley and one of said first and said second pulleys being in engagement through said belt; and
    a clutch mechanism, said output shaft selectively operatively connected to said drive shaft through said clutch mechanism.

41. The transmission of claim 40, wherein said clutch mechanism comprises a friction clutch.

42. The transmission of claim 41, wherein said friction clutch comprises a cone clutch.

43. The transmission of claim 40, wherein said pitch means comprises:
    a first pulley end, a second pulley end and a pulley center section; said first pulley end, said second pulley end and said pulley center section rotatable about said common axis of rotation; said pulley center section disposed intermediate said first pulley end and said second pulley end, said second pulley end substantially immovable relative to said first pulley end along said common axis of rotation, said second pulley end and said first pulley end substantially immovable along said common axis of rotation, said pulley center section movable along said common axis of rotation.

44. The transmission of claim 40, wherein said pitch means comprises:

a first pulley end, a second pulley end and a pulley center section; said first pulley end, said second pulley end and said pulley center section rotatable about said common axis of rotation; said pulley center section disposed intermediate said first pulley end and said second pulley end, said second pulley end substantially immovable relative to said first pulley end along said common axis of rotation, said pulley center section immovable along said common axis of rotation, said first pulley end and said second pulley end movable together along said common axis of rotation.

45. The transmission of claim 40, wherein said output shaft is an axle, said axle axis of rotation being perpendicularly disposed to said drive shaft axis of rotation, said axle being selectively operatively connected to said drive shaft.

46. The transmission of claim 45, further comprising a clutch mechanism, said axle being selectively operatively connected to said drive shaft through said clutch mechanism.

47. The transmission of claim 40, further comprising a pivot pulley assembly which comprises said first and said second pulleys, said pivot pulley assembly further comprising a pivot arm pivotably attached to said housing, said first and second pulleys being rotatably attached to said pivot arm.

48. The transmission of claim 47, wherein said axes of rotation of said first and third pulleys are parallel but separated.

49. The transmission of claim 48, wherein said pivot arm is manually pivoted relative to said housing, the distance between said axes of rotation of said first and third pulleys is changed in response to movement of said pivot arm.

50. The transmission of claim 49, wherein said first and said second pulley pitch diameters are varied in response to movement of said pivot arm, whereby a drive ratio between said first and said second pulleys is varied.

51. The transmission of claim 40, wherein said third pulley has a variable pitch diameter which is varied in response to changes in the pitch diameter of said one of said first and second pulleys.

52. The transmission of claim 51, wherein a drive ratio between said third pulley and said one of said first and second pulleys is variable.

* * * * *